(12) United States Patent
Kamijima et al.

(10) Patent No.: US 6,358,674 B1
(45) Date of Patent: Mar. 19, 2002

(54) METHOD FOR MANUFACTURING A THIN FILM MAGNETIC HEAD

(75) Inventors: Akifumi Kamijima; Junichi Hokushin; Shigekazu Tajima, all of Chuo-ku (JP)

(73) Assignee: TDK Corporation, Tokyo (JP)

( * ) Notice: Subject to any disclaimer, the term of this patent is extended or adjusted under 35 U.S.C. 154(b) by 0 days.

(21) Appl. No.: 09/604,074

(22) Filed: Jun. 27, 2000

(30) Foreign Application Priority Data

Aug. 27, 1999  (JP) .......................................... 11-242282

(51) Int. Cl.$^7$ ................................................ G11B 5/39
(52) U.S. Cl. ...................... 430/320; 430/315; 430/319; 29/603.07
(58) Field of Search ................................ 430/320, 319, 430/315, 314; 29/603.07

(56) References Cited

U.S. PATENT DOCUMENTS

| 5,452,164 A | 9/1995 | Cole et al. | |
|---|---|---|---|
| 6,104,576 A | * 8/2000 | Santini | 360/126 |
| 6,111,724 A | * 8/2000 | Santini | 360/126 |
| 6,154,345 A | * 11/2000 | Ishiwata et al. | 360/317 |
| 6,163,436 A | * 12/2000 | Sasaki et al. | 360/126 |

FOREIGN PATENT DOCUMENTS

| JP | 06020227 A | 1/1994 |
|---|---|---|
| JP | 06044526 A | 2/1994 |
| JP | 7-225917 | 8/1995 |

OTHER PUBLICATIONS

English Language Abstract of JP 6–020227, Jan. 1994.*

* cited by examiner

*Primary Examiner*—John A. McPherson
(74) *Attorney, Agent, or Firm*—Oliff & Berridge, PLC

(57) ABSTRACT

In forming a second pole portion and a second yoke portion independently, after a first magnetic film, a gap film, a coil film, an insulating film and a second pole portion are formed, a plate underfilm M1 is formed on their exposed surfaces. Then, a negative type resistfilm is applied on the plate underfilm M1, and exposed and developed to fabricate a resistframe ton define a pattern for a second yoke portion. Then, a plate film to constitute a second yoke portion is formed.

8 Claims, 27 Drawing Sheets

M1  52  51

METHOD FOR MANUFACTURING A THIN FILM MAGNETIC HEAD

BACKGROUND OF THE INVENTION

1) Field of the Invention

This invention relates to a method for manufacturing a thin film magnetic head.

2) Related Art Statement

In a manufacturing method of a thin film magnetic head, normally, a second magnetic film serving as a top magnetic film is formed after a first magnetic film (bottom magnetic film), a gap film, an insulating film to support a coil film are formed on a wafer. Moreover, in the case of forming the second magnetic film, a plate underfilm is formed on the whole surface of the wafer including the insulating film by a sputtering method, etc. Subsequently, a positive type photoresist is applied on the surface of the plate underfilm and is processed by a photolithography method to form a resistframe for forming the second magnetic film. Then, the second magnetic film is formed in the area enclosed by the positive type resistframe by an electroplating ,etc. A film composed of the material constituting the second magnetic film is plated in an area beyond the positive type resistframe, but it is removed.

In the second magnetic film-forming process, however, there is a problem due to the positive type resistframe. That is, an exposing light in the photolithography process to form the positive resistframe is reflected at the surface of the plate underfilm and then, the reflected exposing light reaches an area beyond a photomask-defining area and exposes the positive type photoresist around the area, resulting in the degradation in the pattern precision of the positive type resistframe and the second magnetic film.

The degradation of the pattern precision is conspicuous at the pole portion of the second magnetic film. The pole portion of the second magnetic film is opposed to the first magnetic film via the gap film. On the backward area from the pole portion is positioned the insulating film rising up with an inclination of a given angle from the surface of the gap film. The starting point of the rising up corresponds to a Throat Height zero point and the rising up angle corresponds to an Apex Angle.

The second magnetic film constitutes the pole portion parallel to the gap film and the first magnetic film up to the Throat Height zero point and then, rises up with an inclination of the Apex Angle toward the top surface of the insulating film from the Throat Height zero point.

Thus, in the case of fabricating the positive type resistframe for forming the second magnetic film by the photolithography process, the positive type photoresist stuck on the inclined portion at the Apex Angle toward the top surface of the insulating film must be exposed.

In this case, the plate underfilm stuck on the inclined portion reflects the exposing light. The part of the reflected exposing light reaches the pole portion. Thus, the exposed pattern of the pole portion is different from that of the photomask, resulting in the pattern destruction in the portion of the positive type resistframe corresponding to the pole portion.

The pattern destruction of the positive type resistframe has difficulty in developing a recording density by narrowing a recording track width up to not more than 1.0 μm.

To narrow the recording track width, Kokai Publication Kokai Hei 7-225917 (JP A 7-2259917) discloses that before forming the second magnetic film, a second pole portion and a back gap portion are formed, and then, a yoke portion composed of the second magnetic film is formed. That is, the document discloses that the second pole portion and the second yoke portion composed of the second magnetic film are formed independently. In the thin film magnetic head described in the above document, the yoke portion composed of the second magnetic film rises up backward from the second pole portion. For improving transmission efficiency of writing magnetic flux, it is desired that the second yoke portion has its almost vertical end (almost parallel end to an air bearing surface (hereinafter, called as a "ABS")).

However, when the resistframe for forming the second yoke portion is formed of a positive type resist material, the exposing light exposes the area for the second yoke portion to be formed, to degrade the pattern precision of the positive type resistframe. As a result, it is difficult to form, almost parallel to the ABS, the end of the second yoke portion in the side of the ABS.

SUMMARY OF THE INVENTION

It is an object of the present invention to provide a manufacturing method in which a thin film magnetic head is formed so as to have a second yoke portion with a vertical end (parallel end to an ABS) in the side of the ABS, in forming its second pole portion and the second yoke portion independently.

To achieve the object, this invention discloses two types of manufacturing method of the thin film magnetic head.

The first type of manufacturing method relates to a method for manufacturing a thin film magnetic head comprising a slider having an air bearing surface on its medium opposing surface and a thin film magnetic head element having a first magnetic film, a coil film, an insulating film, a gap film and a second magnetic film, the first magnetic film including a first pole portion composed of its edge portion in the side of the air bearing surface and a first yoke portion continuing to the first pole portion and extending backward from the first pole portion, the gap film being provided at least on the first pole portion, the insulating film being provided above the first yoke portion and supporting the coil film, the second magnetic film including a second pole portion opposing to the first pole portion via the gap film and a second yoke portion of which one end continues to and rises up on the second pole portion and of which the other end is joined with the first yoke portion at its rear portion, comprising of the steps of:

forming, after forming the first magnetic film, the gap film, the coil film, the insulating film and the second pole portion, a plate underfilm on their exposed surfaces, applying a negative type photoresist film on the plate underfilm, forming a resistframe to define a pattern for forming the second yoke portion through exposing and developing for the negative type photoresist film, and forming a plate film to constitute the second yoke portion.

As mentioned above, in the first type of manufacturing method, the negative type resistfilm is applied on the plate underfilm, and thereafter, is exposed and developed to fabricate the resistframe to define the pattern to be used in forming the second yoke portion.

According to the above manufacturing method, in forming the resistframe to define the pattern to be used for the second yoke portion, an exposing light for the negative type resistfilm is irradiated to the area except the pattern for the second yoke portion, which is quite different from the above conventional manufacturing method in which the exposing light is required to be irradiated to the area within the pattern for the second yoke portion. Therefore, the exposing light is not reflected at the plate underfilm within the pattern for the second yoke portion. As a result, the pattern to be used in forming the second yoke portion can be fabricated precisely.

Moreover, in the thin film magnetic head having an extremely narrowed recording track width through forming the second pole portion and the second yoke portion independently, the second yoke portion can be formed so as to have its vertical end (parallel end to the ABS) in the side of the ABS.

The second type of manufacturing method relates to a method for manufacturing a thin film magnetic head comprising a slider having an air bearing surface on its medium opposing surface and a thin film magnetic head element having a first magnetic film, a coil film, an insulating film, a gap film and a second magnetic film, the first magnetic film including a first pole portion composed of its edge portion in the side of the air bearing surface and a first yoke portion continuing to the first pole portion and extending backward from the first pole portion, the gap film being provided at least on the first pole portion, the insulating film being provided above the first yoke portion and supporting the coil film, the second magnetic film including a second pole portion opposing to the first pole portion via the gap film and a second yoke portion of which one end continues to and rises up on the second pole portion and of which the other end is joined with the first yoke portion at its rear portion, comprising of the steps of:

forming, after forming the first magnetic film, the gap film, the coil film, the insulating film and the second pole portion, a plate underfilm on their exposed surfaces, forming a base organic resin film on the plate underfilm applying a negative type photoresist film on the base organic resin film, forming a resistframe to define a pattern for forming the second yoke portion through exposing and developing for the negative type photoresist film, removing the part of the base organic resin film uncovered with the resistframe, and forming a plate film to constitute the second yoke portion.

In this second type of manufacturing method, since the negative type resistfilm is used instead of the positive type resistfilm, the same effects as in the above first type of manufacturing method can be exhibited. Moreover, in this manufacturing method, since the base organic resin film is formed on the plate underfilm, the negative type resistfilm can be joined with the plate underfilm indirectly via the base organic resin film, and thus, is prevented from being peeled off.

The other objects, configurations and advantages will be explained in detail, with reference to the attaching drawings in embodiments.

BRIEF DESCRIPTION OF THE DRAWINGS

For a better understanding of this invention, reference is made to the attached drawings, wherein.

DETAILED DESCRIPTION OF THE PREFERRED EMBODIMENTS

This invention will be explained in detail, with reference to the attaching drawings, hereinafter.

Figure 1:
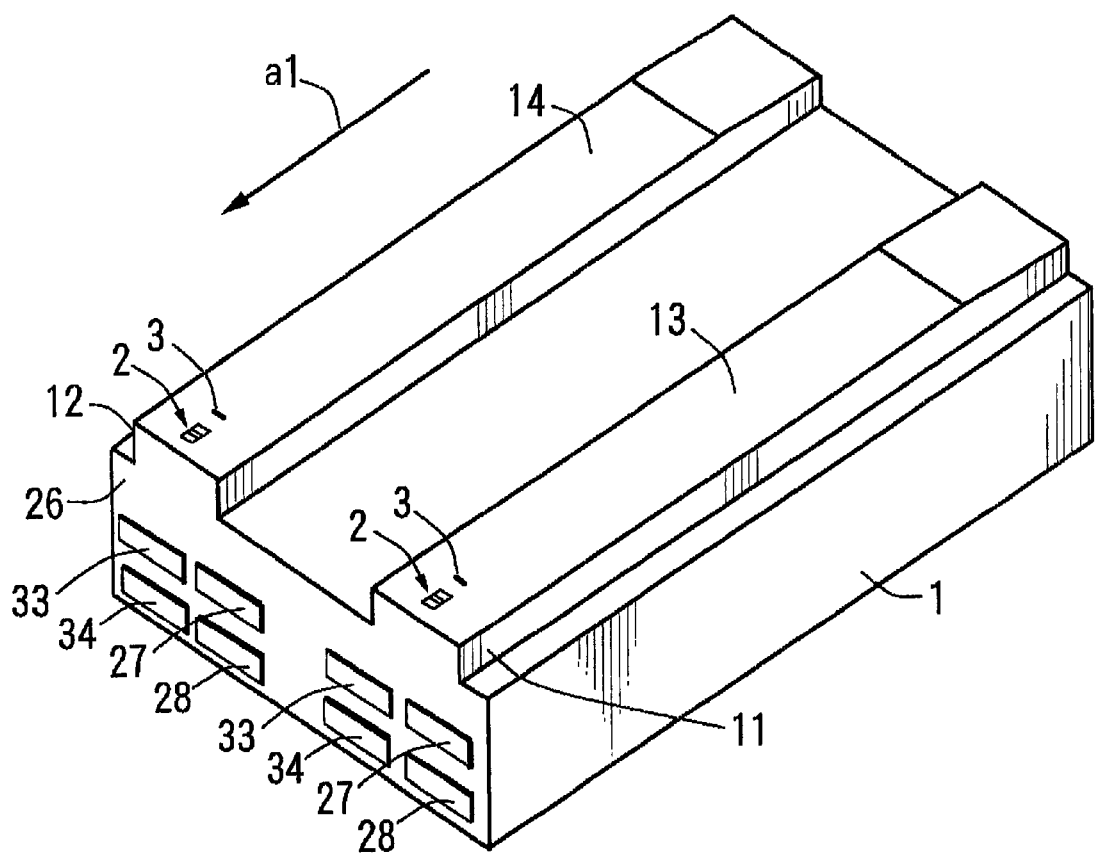
FIG. 1 is a perspective view showing the thin film magnetic head of the present invention.
Figure 2:
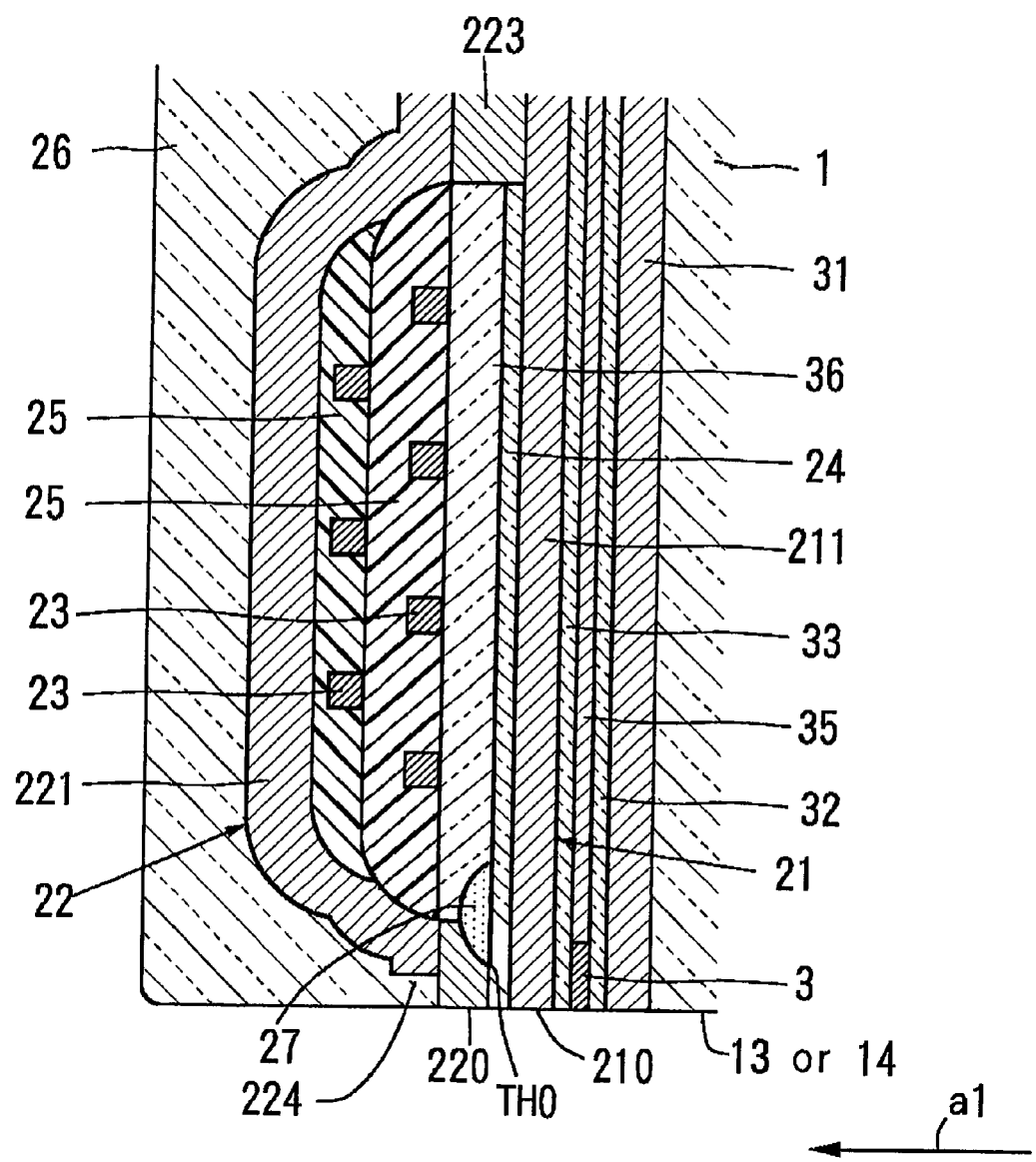
FIG. 2 is a cross sectional view of the thin film magnetic head shown in FIG. 1.

FIG. 1 is a perspective view showing an example in the thin film magnetic head manufactured by the manufacturing method of the present invention, and FIG. 2 is a cross sectional view showing the thin film magnetic head depicted in FIG. 1. In these figures, the each part is exaggerated in size. The thin film magnetic head includes a slider 1 and at least one inductive type thin film magnetic conversion element 2.

The slider 1 has rail parts 11 and 12 on its medium opposing surface, and the surfaces of the rail parts 11 and 12 are employed as air bearing surfaces (hereinafter, often called as "ABSs") 13 and 14. The slider 1 does not always have the two rail parts 11 and 12, and may have one to three rail parts. Moreover, the slider may have a flat surface having no rail part. For improving its floating characteristic, the slider may have various medium opposing surfaces with geometrical shapes. The present invention can be applied for the sliders having the above various types of surface. The slider 1 is made of a ceramic material such as AlTiC.

The inductive type thin film magnetic conversion element 2, formed on the slider 1, includes a first magnetic film 21, a gap film 24, a second magnetic film 22, a coil film 23, an insulating film 25 and a protective film 26. The first magnetic film 21 has a first pole portion 210 and a first yoke portion 211. The first pole portion 210 is composed of the end portion of the first magnetic film in the side of the ABSs 13 and 14. The first yoke portion 211 is joined with the first pole portion 210 continuously and extended backward from the ABSs 13 and 14. The coil film 23 is supported by the insulating film 25. The gap film 24 is provided at least on the first pole portion 210. The insulating film 25 is provided above the first yoke portion 211 and supports the coil film 23.

The second magnetic film 22 has a second pole portion 220 and a second yoke portion 221. The second pole portion 220 is opposite to the first pole portion 210 via the gap film 24. The second yoke portion 221 is provided on the insulating film 25, continuing to the second pole portion 220, and joined with the first yoke portion 211 at its rear portion.

The first magnetic film 21, the gap film 24, the second magnetic film 22, the coil film 23, the insulating film 25 and the protective film 26 may be formed, of materials well known to a person skilled in the art, in ordinary thicknesses and patterns by normal means, respectively. The favorable examples will be described as follows:

First of all, the first magnetic film 21 is formed, of a soft magnetic material such as NiFe, CoFe, CoFeNi, in a thickness of about 0.5–4 $\mu$m. The forming means is a plating method, a sputtering method or the like.

Then second magnetic film 22 is formed, of a soft magnetic material such as NiFe, CoFe, CoFeNi, in a thickness of about 2–5 $\mu$m. The forming means is a frame plating method, etc., which will be concretely described in the manufacturing method of the present invention.

The coil film 23 is made of a conductive material such as Cu. The coil film 23 preferably has a thickness of 1–5 $\mu$m. The coil film 23 is formed by a frame plating method, etc.

The gap film 24 may be made of a nonmagnetic insulating material such as $Al_2O_3$, $SiO_2$ or a nonmagnetic metallic material. In using the nonmagnetic insulating material such as $Al_2O_3$, $SiO_2$, the gap film 24 may be formed by a sputtering method, etc. In using the nonmagnetic metallic material, the gap film 24 may be formed by a plating method or a sputtering method. The gap film preferably has a thickness of about 0.01–0.5 $\mu$m.

The insulating film 25 is preferably formed by hardening a photoresist material. The layer number and thickness of the insulating film 25 varies, depending on the number of the coil film 23 and the coil-supporting structure. Generally, the film 25 has a thickness of about 3–20 $\mu$m.

The protection film 26 may be made of an insulating material such as $Al_2O_3$, $SiO_2$. The film 26 preferably has a thickness of 5–50 $\mu$m. The film 26 may be preferably formed by a sputtering etc.

The coil film 23 constitutes a thin film magnetic circuit with the first and second magnetic films 21, 22 and the gap film 24. The coil film 23 is supported by the insulating film 25 and winds vertically around the connection of the yoke portions. Both ends of the coil film 23 are conductively connected to pull-out electrodes 27 and 28 (see, FIG. 6). The winding number of the layer number of the coil film 23 are not restricted. In the example, the coil film 23 has two-layered structure.

The illustrated thin film magnetic head further includes a second insulating film 27, provided on the base portion of the first insulating film 25, to determine the Throat Height zero point.

The second yoke portion 221 composed of the second magnetic film 22 is provided on the first insulating film 25, one end of the second yoke portion being joined with the second pole portion 220, the other end being joined with the first yoke portion 211 at the rear joining portion 223.

In the thin film magnetic head shown in those figures, the slider 1 has the ABSs 13 and 14 and the thin film magnetic conversion element 2 on the slider 1, so that the magnetic head constitutes a floating type thin film magnetic head for a magnetic recording medium such as a magnetic disk.

Since the second yoke portion 221 of the second magnetic film 22 is magnetically joined with the first magnetic film 21 at its rear portion, a magnetic field generated from a current in the coil film 23 can be effectively transmitted to the first pole portion 210 and the second pole portion 220 via the second yoke portion 221.

Figure 3:
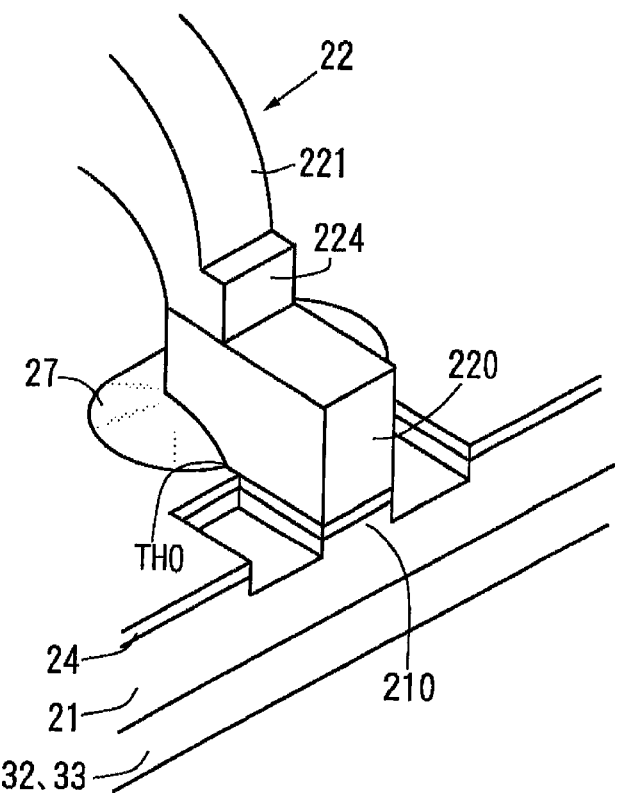
FIG. 3 is a perspective view showing the pole portion of the thin film magnetic head shown in FIGS. 1 and 2.

The thin film magnetic film shown in FIGS. 1–3 has the inductive type magnetic conversion element 2 for writing and a MR element 3 for reading. The thin film electromagnetic conversion elements 2 and 3 are provided on each edge or both edges of the rail parts 11 and 12 in a medium-moving direction a1, which corresponds to an outflow direction of an air at a high speed movement of the medium. On the end of the slider 1 in the medium-moving direction a1 are the pull-out electrodes 27 and 28 connected to the thin film electromagnetic conversion element 2 and the pull-out electrodes 33 and 34 connected to the thin film electromagnetic conversion element 3.

As of now, the MR element 3 having any kind of film-structure is proposed and is practically used. For example, the MR element may be composed of an anisotropic magnetic resistive effective element made of permalloy, etc., and a giant magnetic resistive (GMR) effective film. In the present invention, any kind of film-structure may be employed for the MR element 3. The MR element 3 is positioned on the insulating film 32 between a first shielding film 31 and the first magnetic film 21 doubling as a second shielding film. The insulating film 32 is made of alumina, etc. The MR element 3 is connected to pull-out electrodes 33 and 34 (see, FIG. 1) via a leading conductor 35 (see, FIG. 2).

<The first type of manufacturing method>

In this embodiment, the thin film magnetic head illustrated in FIGS. 1–3 will be manufactured by the first type of manufacturing method of the present invention. FIGS. 4–27 shows the steps included in the first type of manufacturing method. In these figures, the same reference is given to the same part as the one of the thin film magnetic head in FIGS. 1–3. Although the manufacturing method according to the present invention is carried out on a wafer, in these figures, it is assumed that the manufacturing method is performed for one element on the wafer. For convenience, all the sizes of the parts of the thin film magnetic head do not coincide in those figures, and may be exaggerated.

Figure 4:
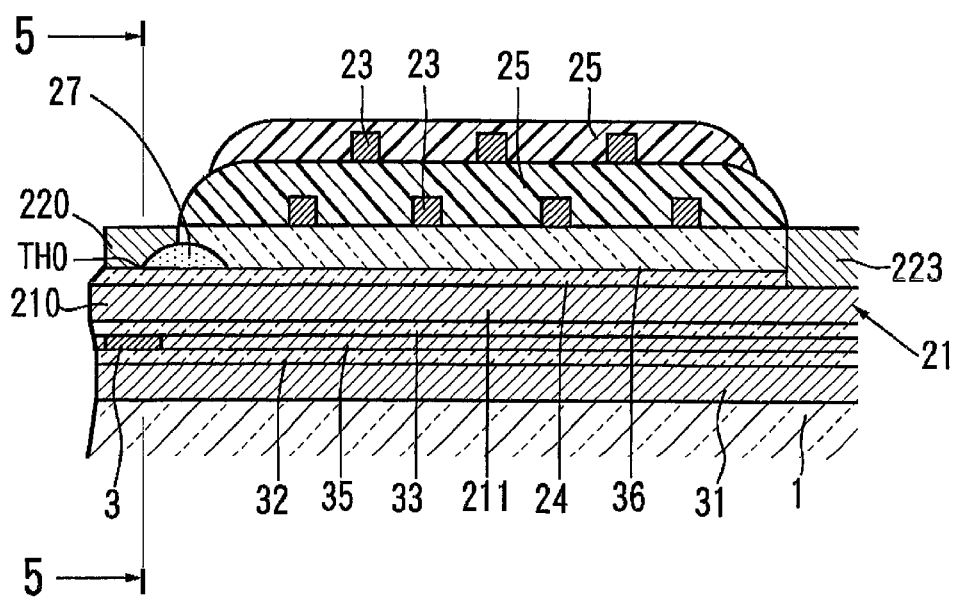
FIG. 4 is a cross sectional view showing one step included in the first type of manufacturing method of the present invention.
Figure 5:
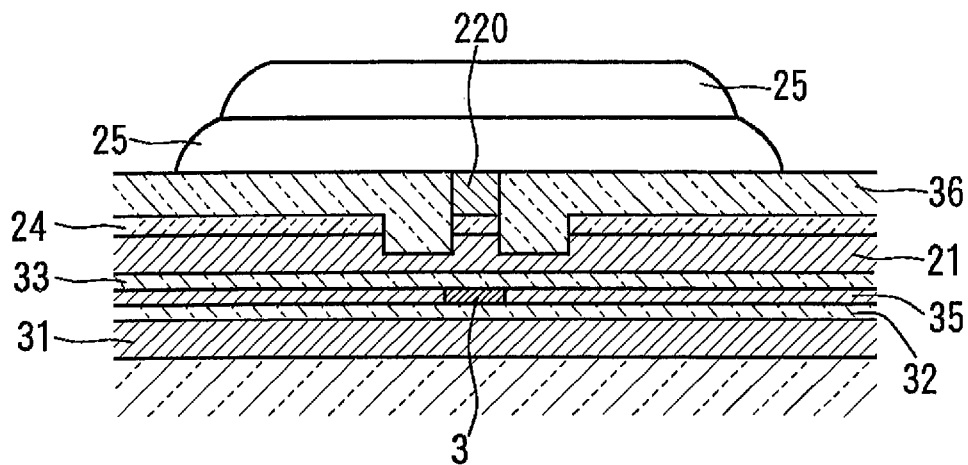
FIG. 5 is a cross sectional view taken on line "5—5" of FIG. 4.

First of all, the manufacturing method will be described, with reference to FIGS. 4 and 5. FIG. 4 is an elevational section view of the magnetic conversion element in the assembly of the thin film magnetic head in a manufacturing step, and FIG. 5 is a cross sectional view, taken on line "5–5" of FIG. 8. In these figures, the first magnetic film 21, the gap film 24, the insulating film 25 to support the coil film 23 and the second pole portion 220 are already formed on a substrate 1 to be the slider. The MR element 3, the first shielding film 31, the insulating film 32 and the leading conductor 35 are already formed. They may be formed by manufacturing processes well known to an ordinary skilled in the art.

Figure 6:
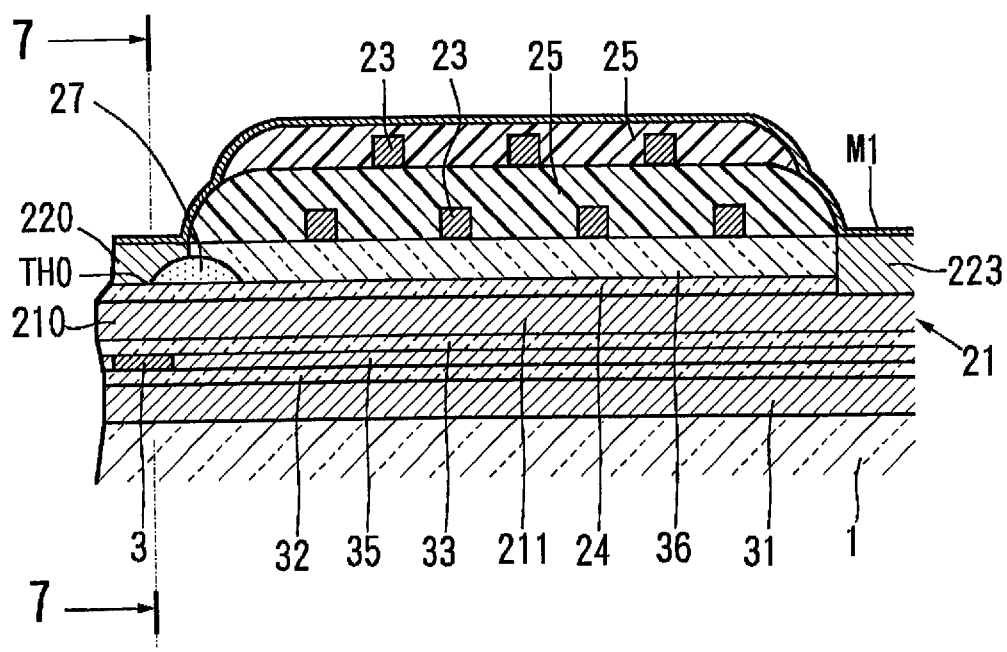
FIG. 6 is a cross sectional view showing the step after the step in FIGS. 4 and 5.
Figure 7:
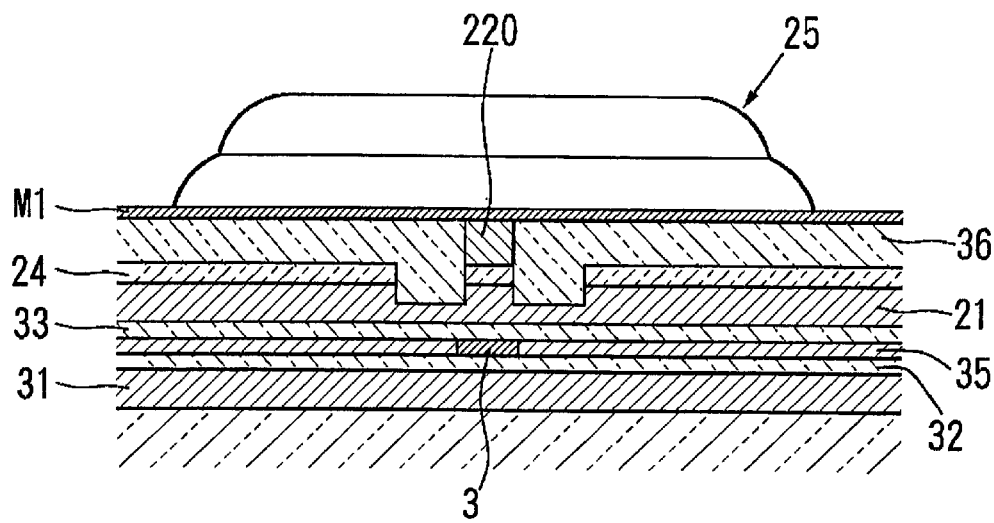
FIG. 7 is a cross sectional view taken on line "7—7" of FIG. 6.

Next, as shown in FIGS. 6 and 7, a plate underfilm (seed film) M1 to plate-form the second magnetic film is formed over the whole surface of the assembly including the insulating film 25 and the second pole portion 220. The plate underfilm M1 may be made of a magnetic material incorporating Fe component such as permalloy by sputtering or the like.

Figure 8:
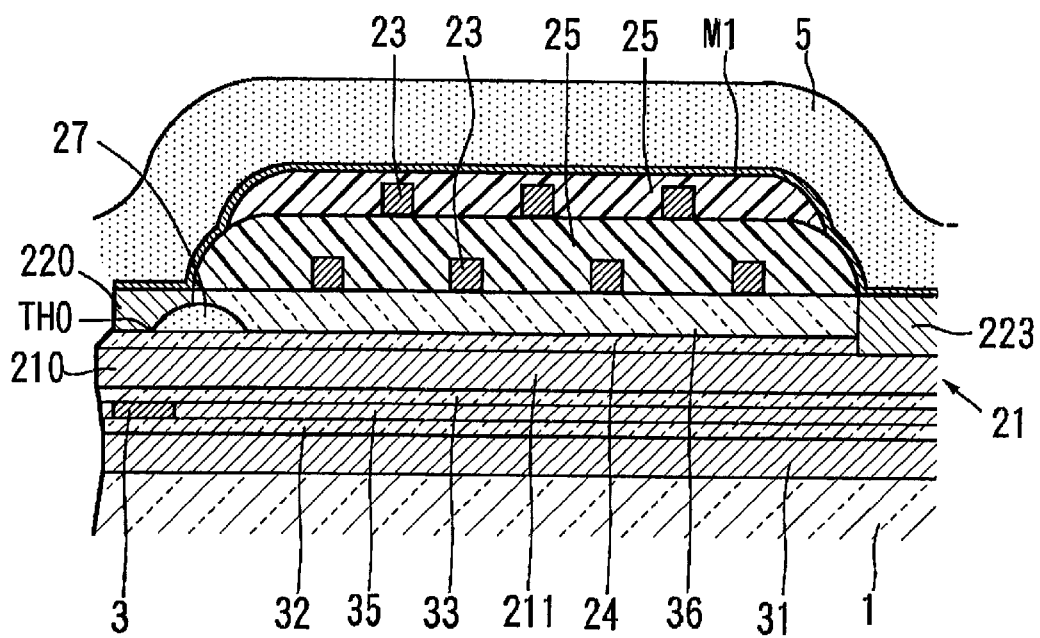
FIG. 8 is a cross sectional view showing the step after the step in FIGS. 6 and 7.

Then, as shown in FIG. 8, a negative type resistfilm 5 is applied on the plate underfilm M1 by a spin coating method or the like. The negative type resistfilm may be made of a well known resist material, preferably chemical amplification type resist material.

Figure 9:
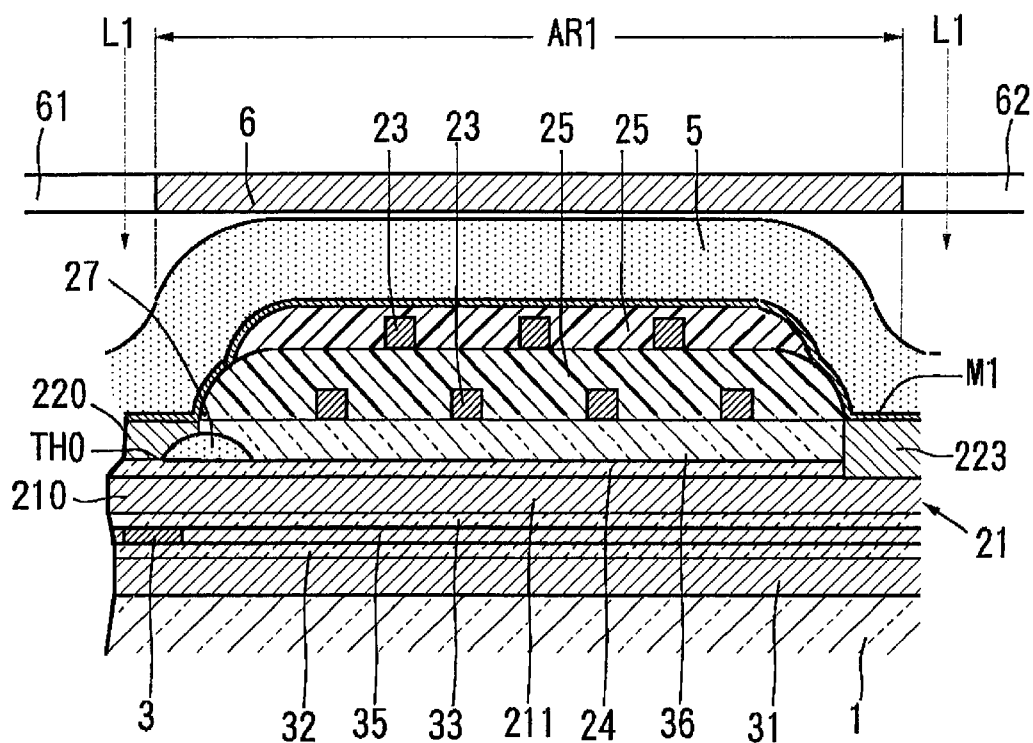
FIG. 9 is a cross sectional view showing the step after the step in FIG. 8.
Figure 10:
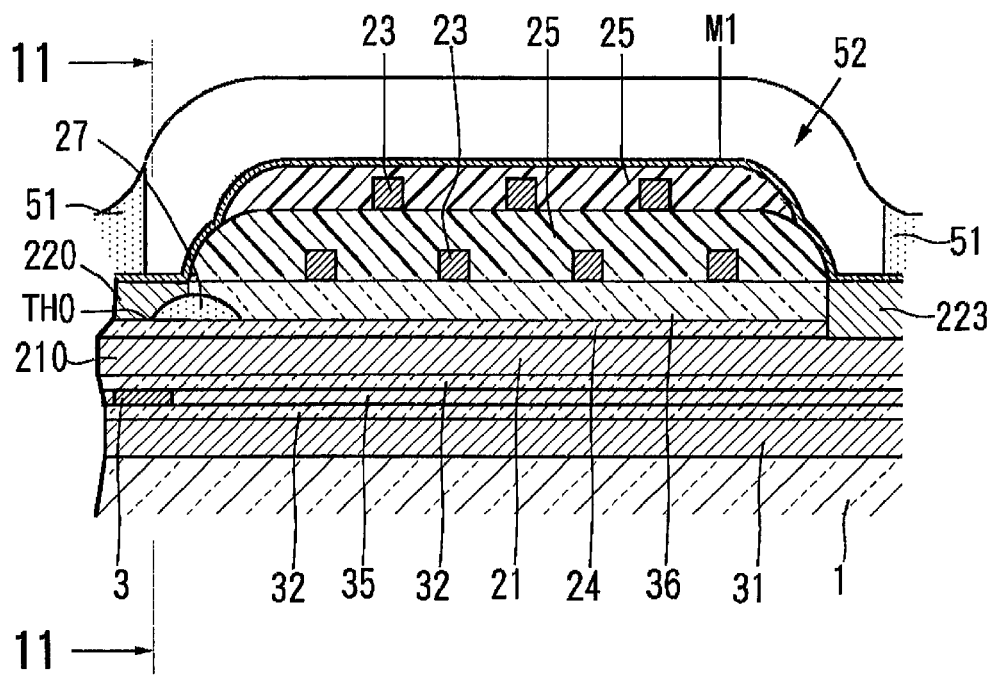
FIG. 10 is a cross sectional view showing the step after the step in FIG. 9.
Figure 11:
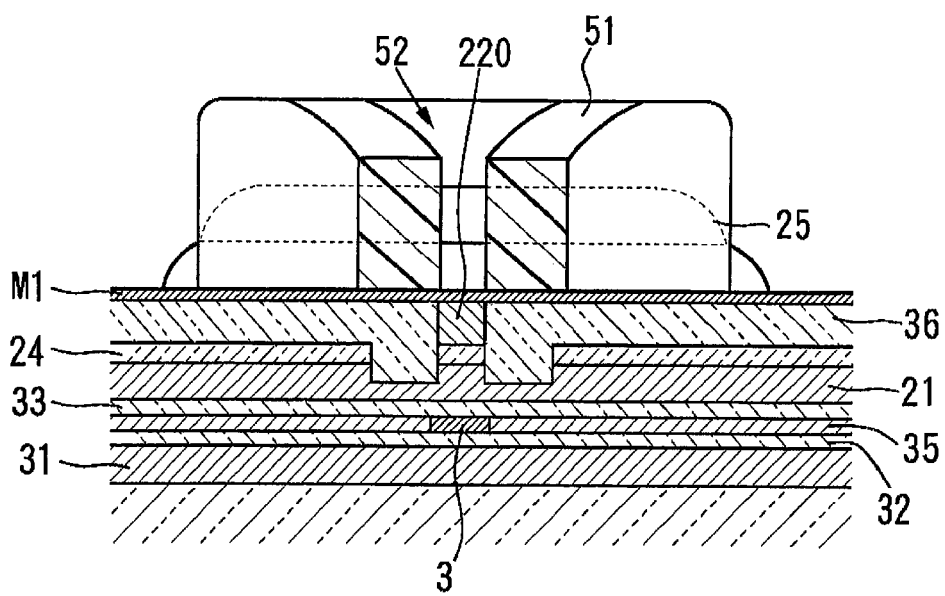
FIG. 11 is a cross sectional view taken on line "11—11" of FIG. 10.
Figure 12:
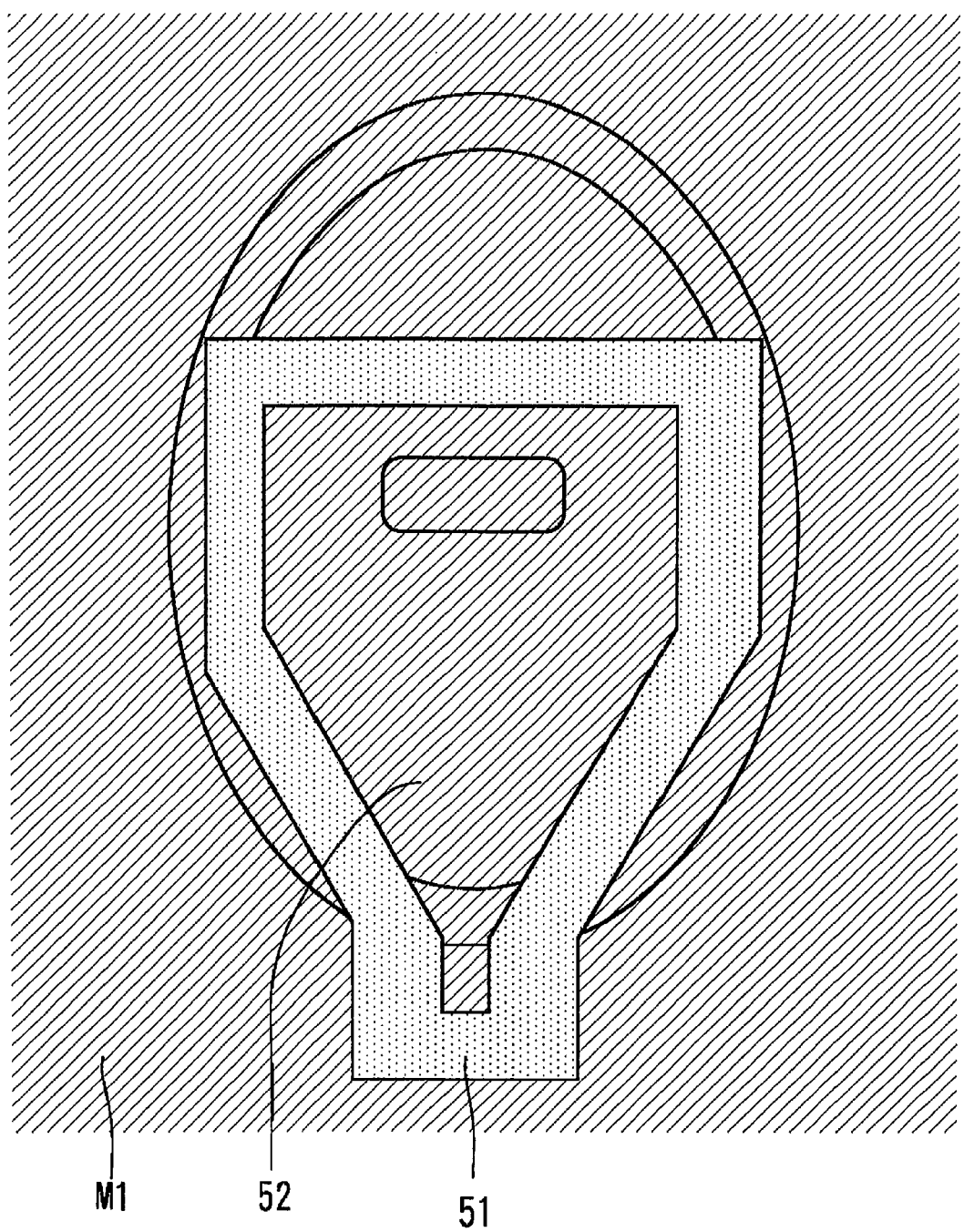
FIG. 12 is a plan view showing the step in FIGS. 10 and 11.

Subsequently, for forming the second yoke portion 221 (see, FIGS. 2 and 3) composed of the second magnetic film 22, a photolithography process is performed for the negative type resistfilm 5. First of all, as shown in FIG. 9, the negative type resistfilm 5 is exposed via a photomask 6, and thereafter, developed to fabricate a resistframe 51 shown in FIGS. 10–12.

In fabricating the resistframe 51 to define the pattern for the second yoke portion, the light L1 to expose the negative type resistfilm 5 is irradiated via the openings 61, 62 which are positioned outside from the area AR1 for the second yoke portion to be formed. This manufacturing process is quite different from that of the above conventional manufacturing method in which the light to expose the positive type resist film is irradiated within the area AR1. Therefore, in the above manufacturing process, the light L1 is not reflected at the plate underfilm M1 within the area AR1, so that the pattern for the second yoke portion 221 can be fabricated precisely.

Figure 13:
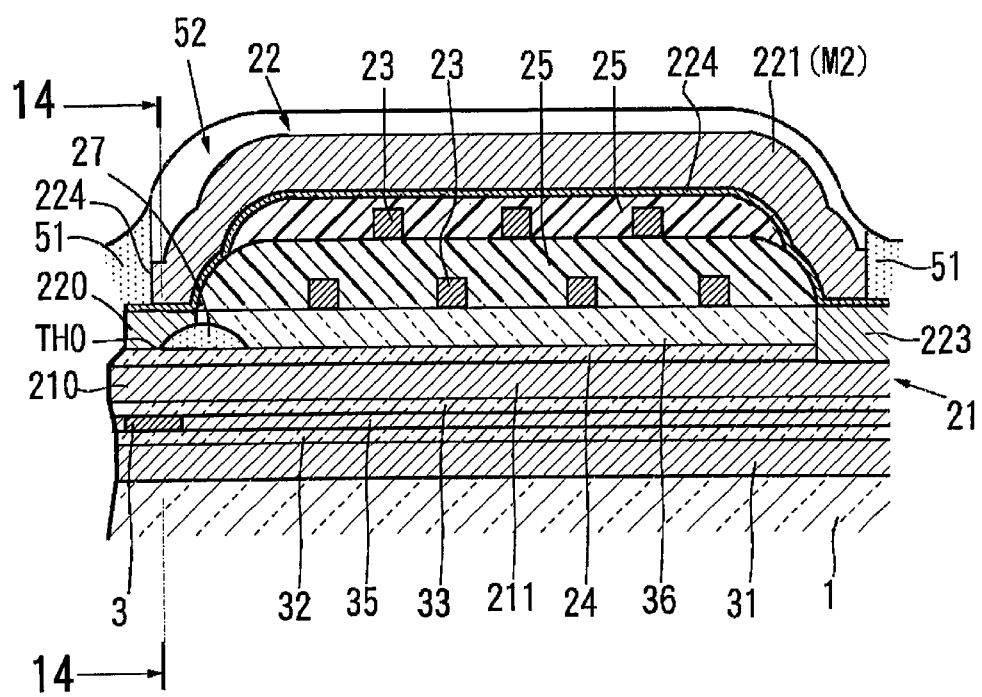
FIG. 13 is a cross sectional view showing the step after the step in FIGS. 10–12.
Figure 14:
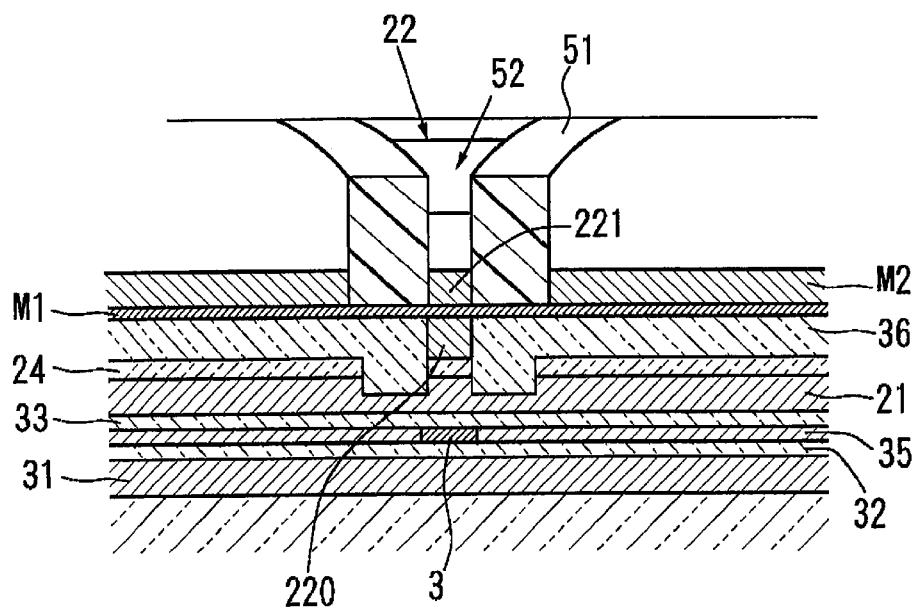
FIG. 14 is a cross sectional view taken on line "14—14" of FIG. 13.
Figure 15:
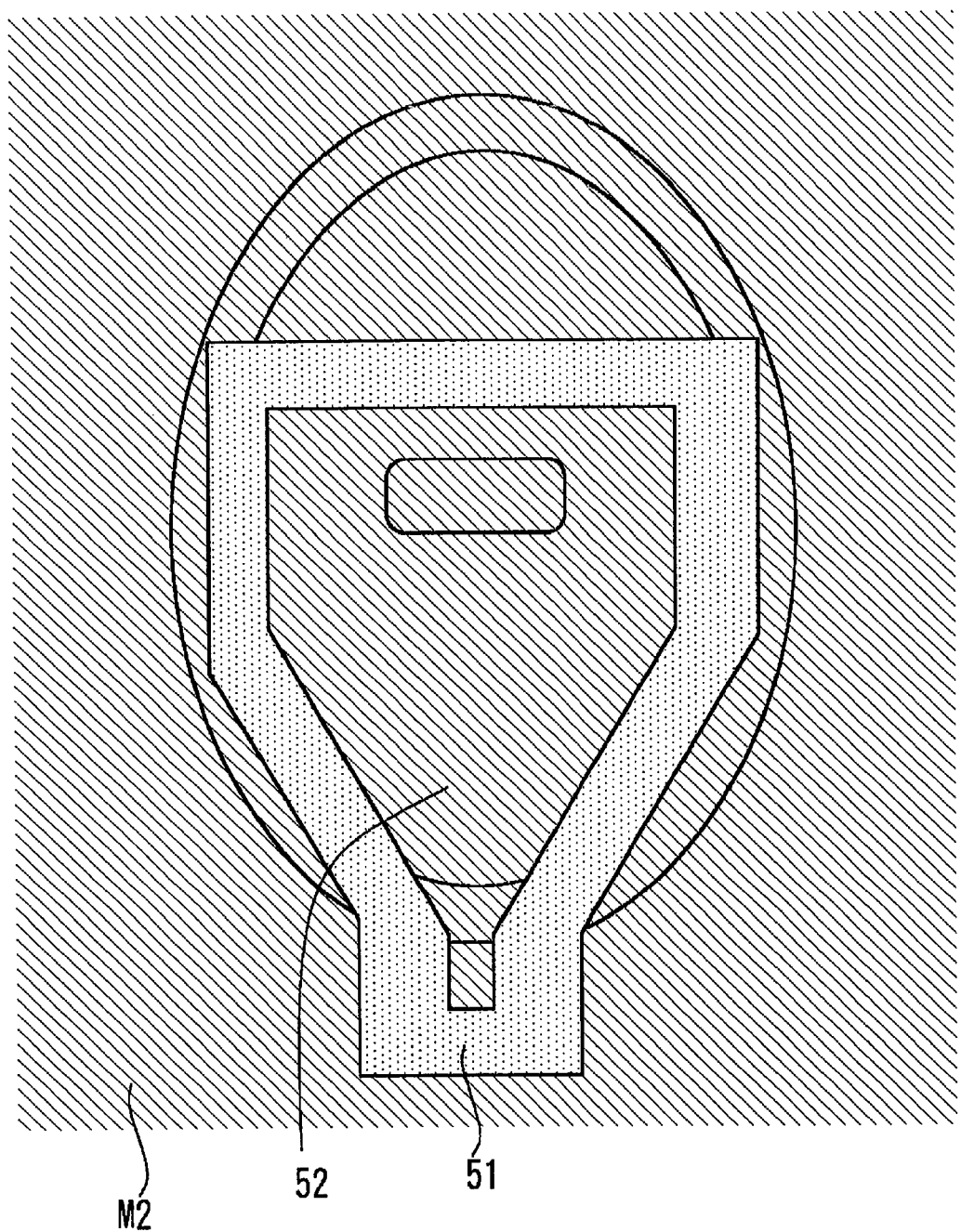
FIG. 15 is a plan view showing the step in FIGS. 13 and 14.

Then, as shown in FIGS. 13–15, a plate film M2 is formed within and without the pattern 52 enclosed by the resistframe 51. The part of the plate film M2 within the pattern 52 constitutes the second yoke portion 221. In this way, since the second pole portion 220 and the second yoke portion 221 are formed independently, the thin film magnetic head having a narrowed recording track width of 1.0 μm or below, for example can be manufactured.

Moreover, because of the negative type resistfilm 5, the end 224 in the side of the ABS of the second yoke portion 221 (see, FIG. 13) can be formed so as to be almost parallel to the ABS (orthogonal to the surface of the second magnetic film 22 constituting the second yoke portion).

Figure 16:
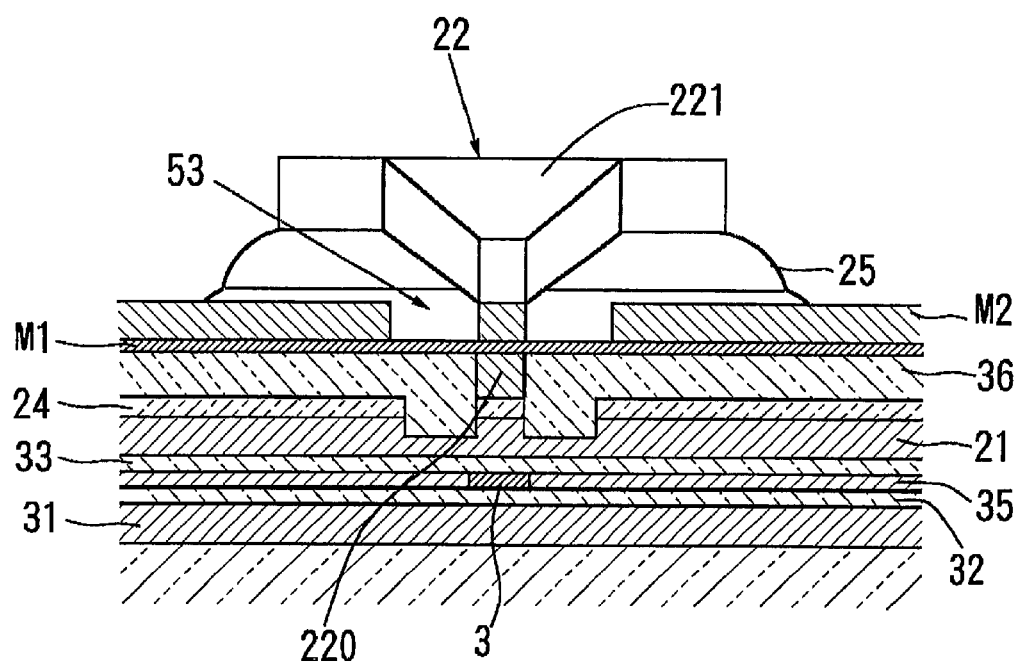
FIG. 16 is a cross sectional view showing the step after the step in FIGS. 13–15.
Figure 17:
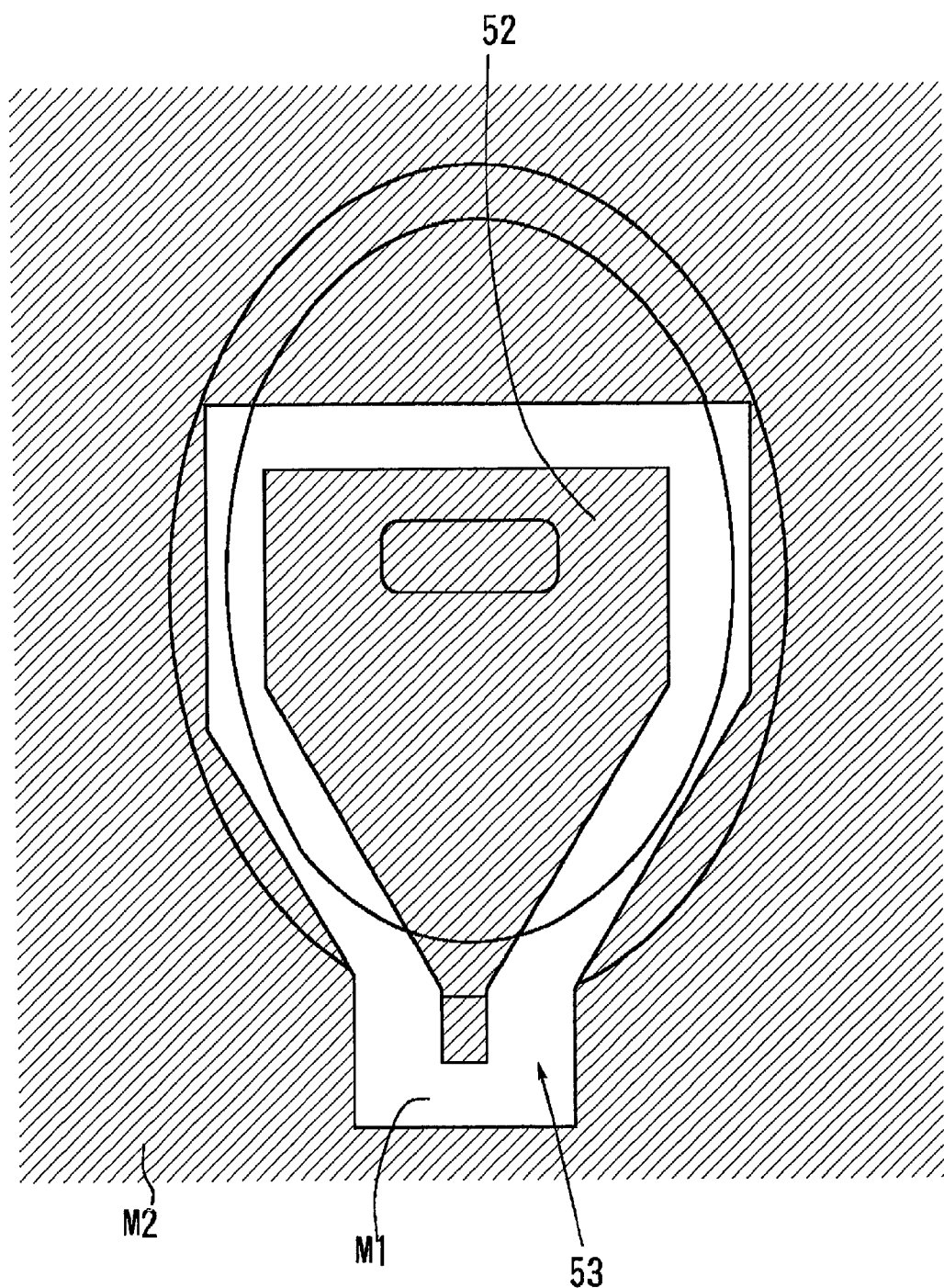
FIG. 17 is a plan view showing the step in FIG. 16.

Then, the resistframe 51 is removed by a dissolving method using an organic solvent or a dry—etching method such as ashing. As shown in FIGS. 16 and 17, the part of the plate underfilm M1 is exposed to the removed area 53 of the resistframe 51.

Figure 18:
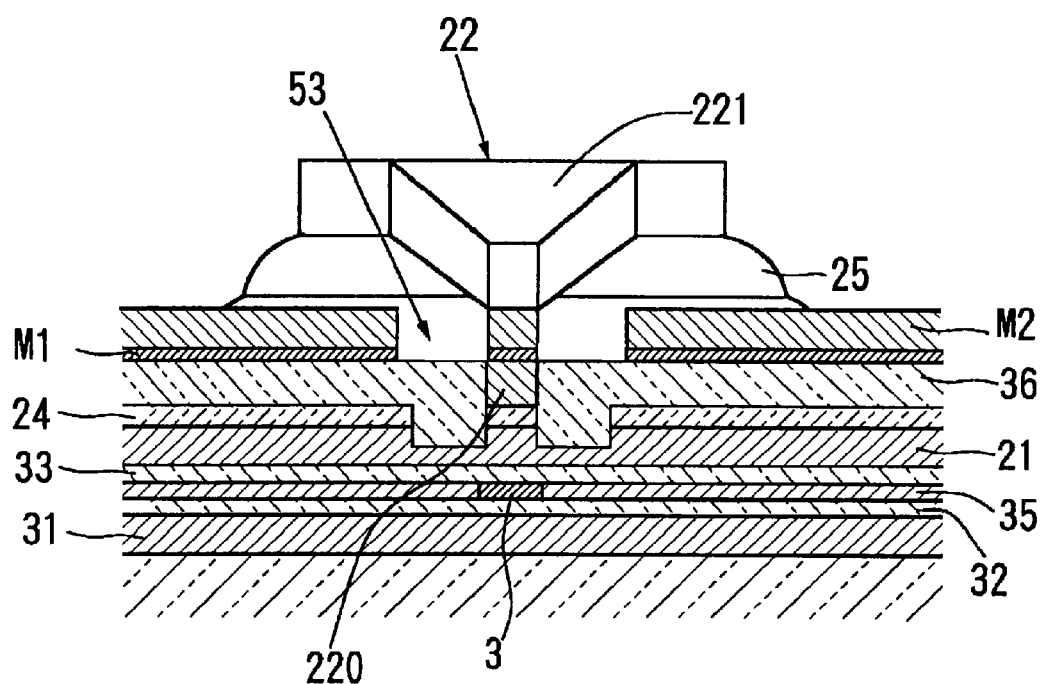
FIG. 18 is a cross sectional view showing the step after the step in FIGS. 16 and 17.
Figure 19:
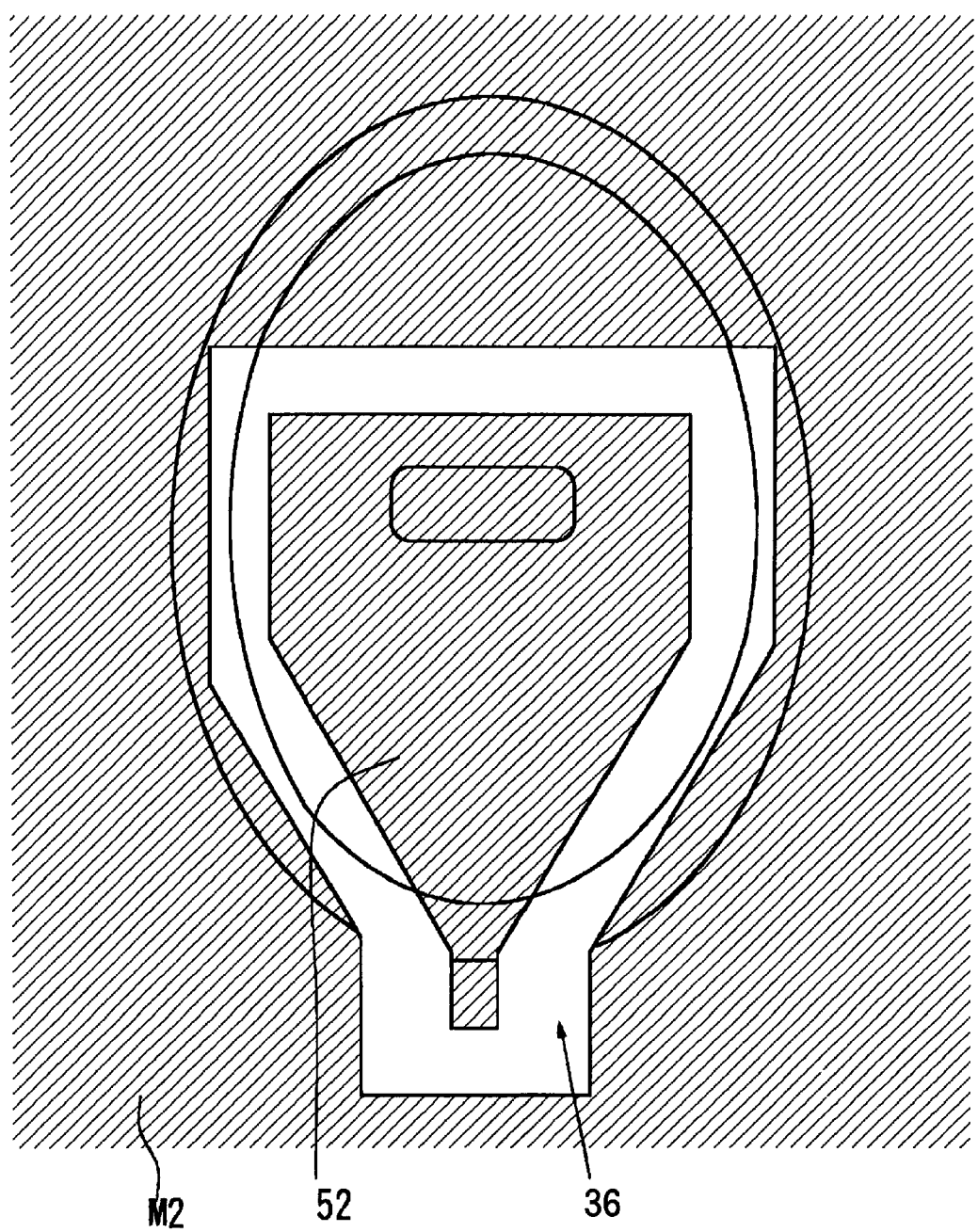
FIG. 19 is a plan view showing the step in FIG. 18.

Subsequently, the part of the plate underfilm M1 exposed to the removed area 53 is removed by a dry-etching method such as milling. FIGS. 18 and 19 shows the assembly of the thin film magnetic head in which the part of the plate underfilm M1 is removed.

Figure 20:
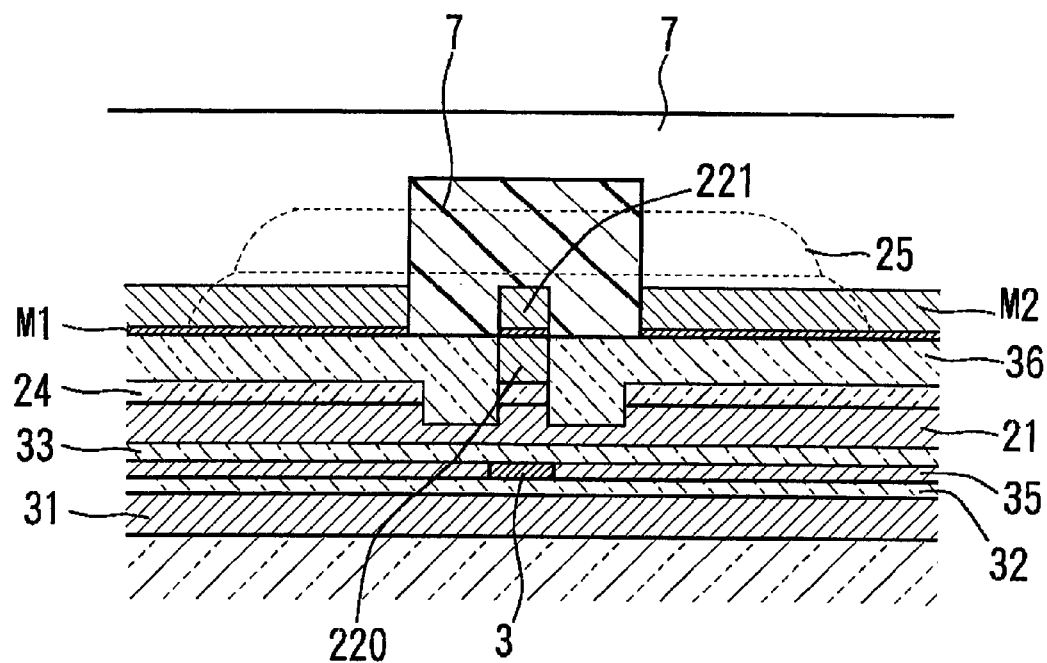
FIG. 20 is a cross sectional view showing the step after the step in FIGS. 18 and 19.
Figure 21:
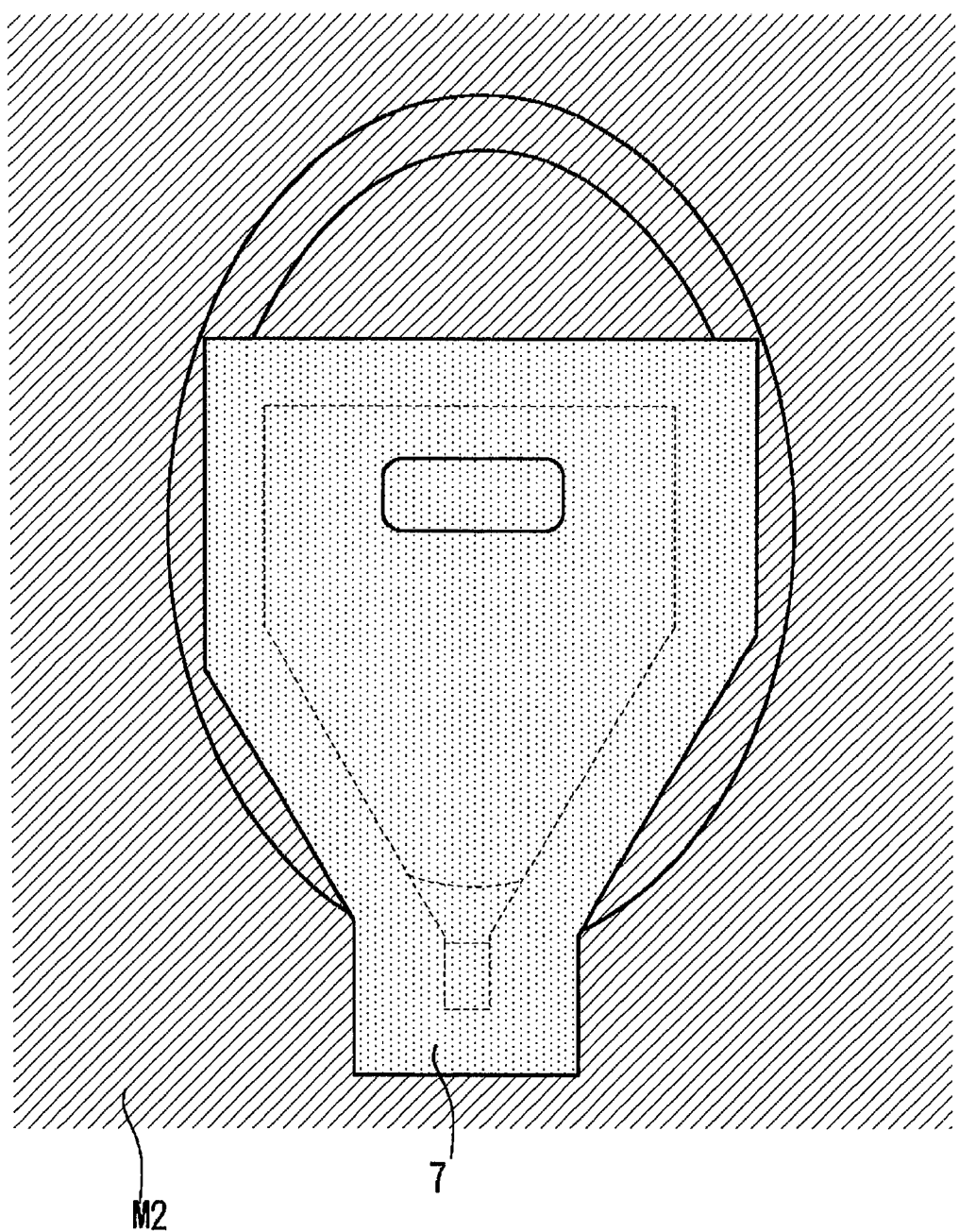
FIG. 21 is a plan view showing the step in FIG. 20.

Then, as shown in FIGS. 20 and 21, the removed area 53 of the resistframe and the plate film M2 inside the pattern 52 (see, FIG. 19) are covered with a resistcover 7. The resistcover 7 may be made of either a positive or negative type resist material.

Figure 22:
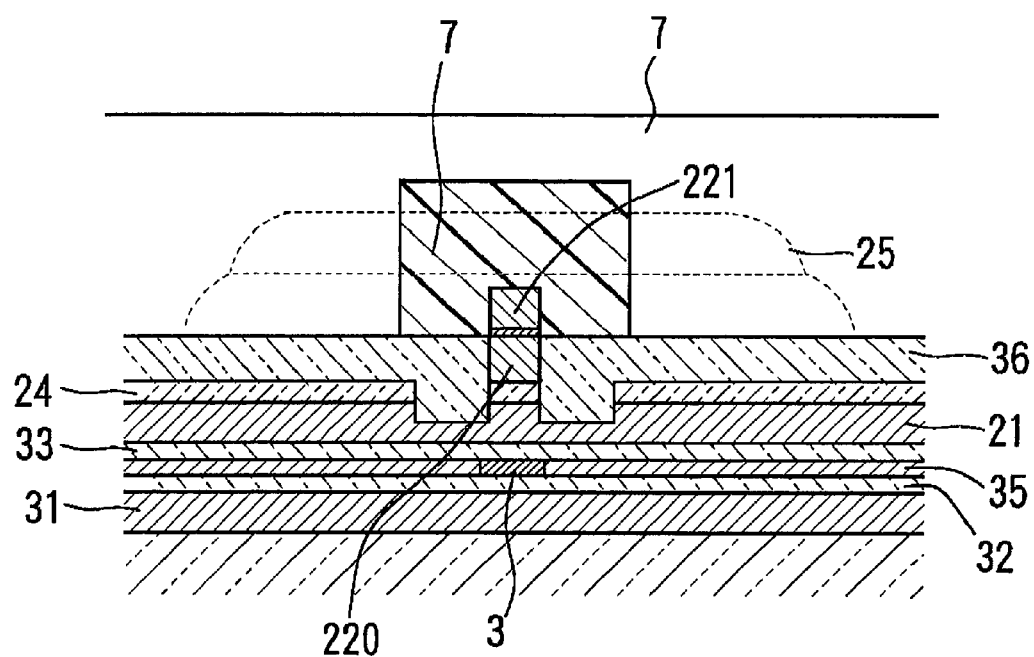
FIG. 22 is a cross sectional view showing the step after the step in FIGS. 20 and 21.
Figure 23:
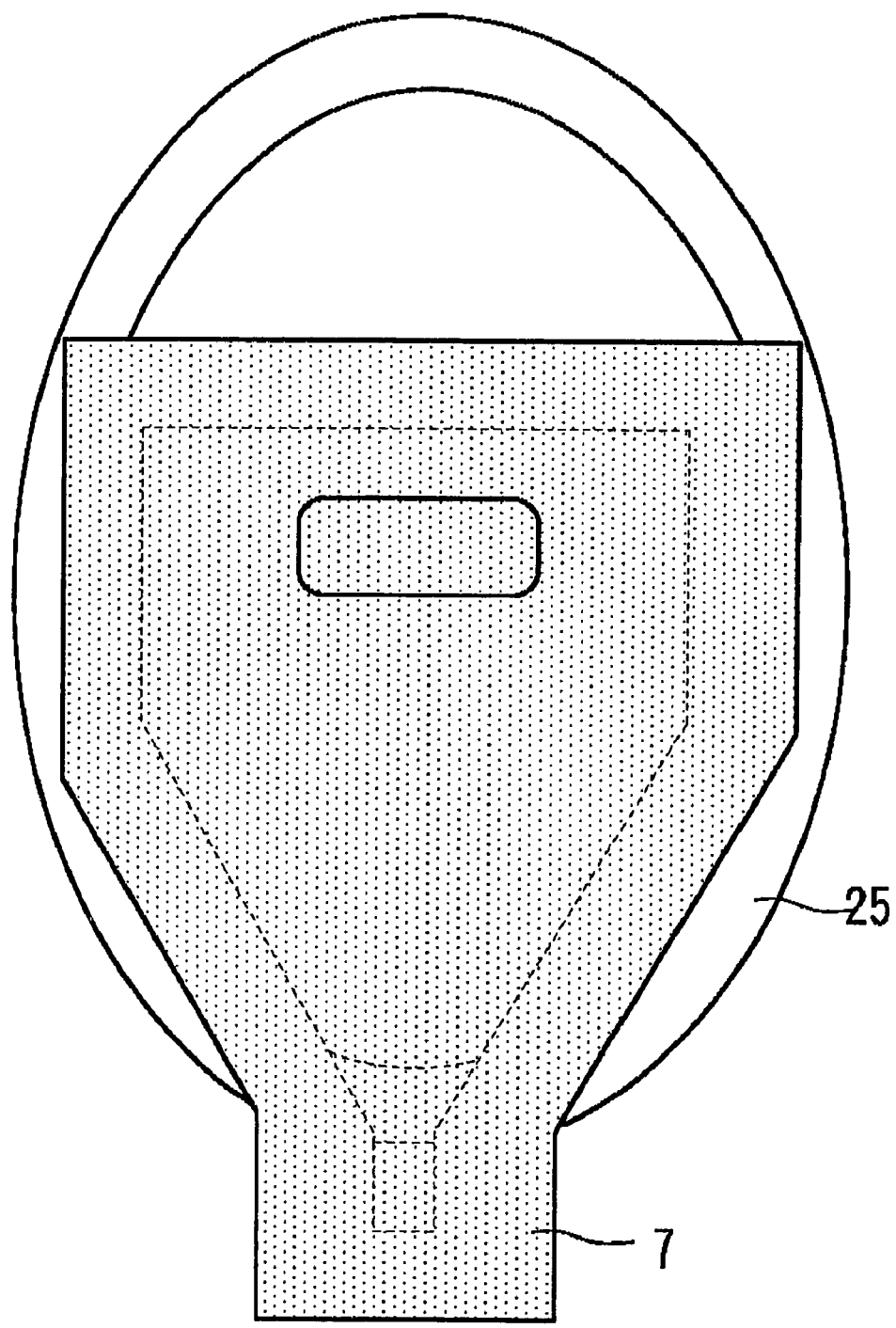
FIG. 23 is a plan view showing the step in FIG. 22.

Subsequently, as shown in FIGS. 22 and 23, the part of the plate film M2 uncovered with the resistcover 7 is removed by a dry-etching method such as milling or a chemical etching method.

Figure 24:
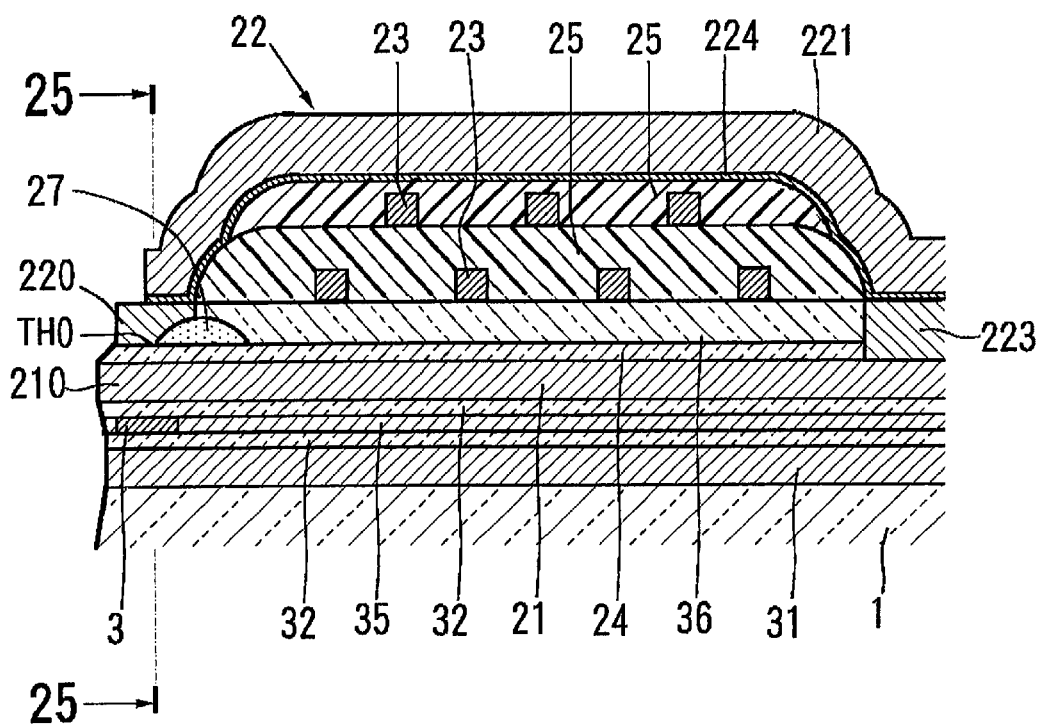
FIG. 24 is a cross sectional view showing the step after the step in FIGS. 22 and 23.
Figure 25:
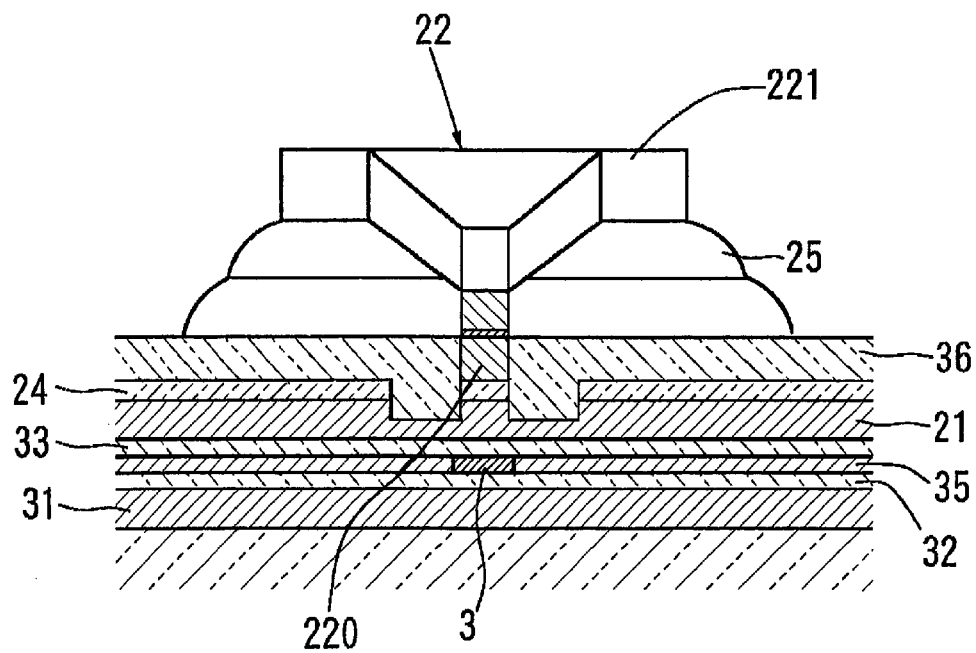
FIG. 25 is a cross sectional view taken on line "25—25" of FIG. 24.
Figure 26:
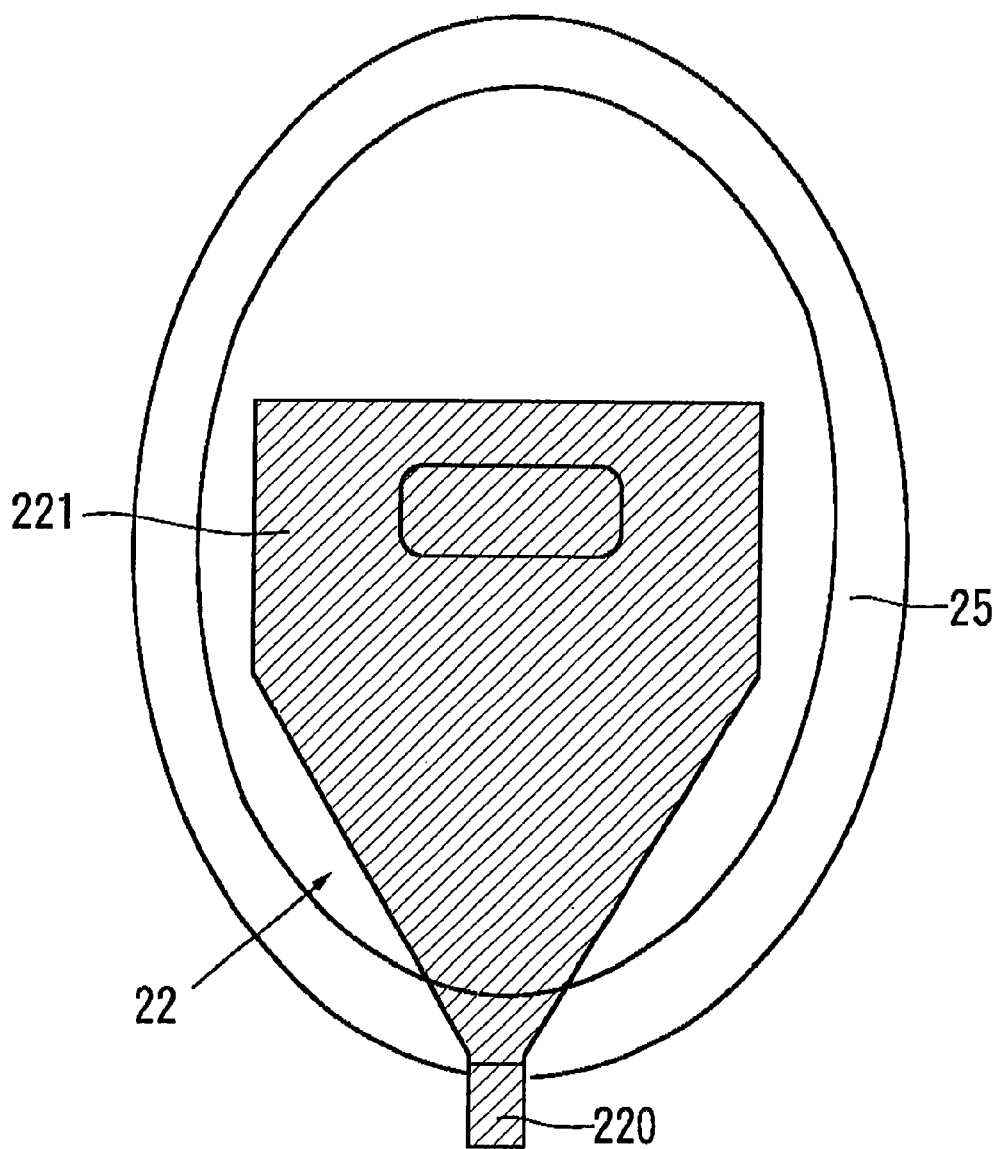
FIG. 26 is a plan view showing the step in FIGS. 24 and 25.

Next, the resistcover 7 is removed by a dissolving method using an organic solvent or a dry-etching method such as ashing to form the second yoke portion 221 shown in FIGS. 24–26. The second yoke portion 221 is provided on the insulating film 25, the end in the side of the ABS continuing to and rising up on the second pole portion 220, the other end being joined with the first yoke portion 211 composed of the first magnetic film 21 at the rear joining portion 223 backward from the ABS.

Figure 27:
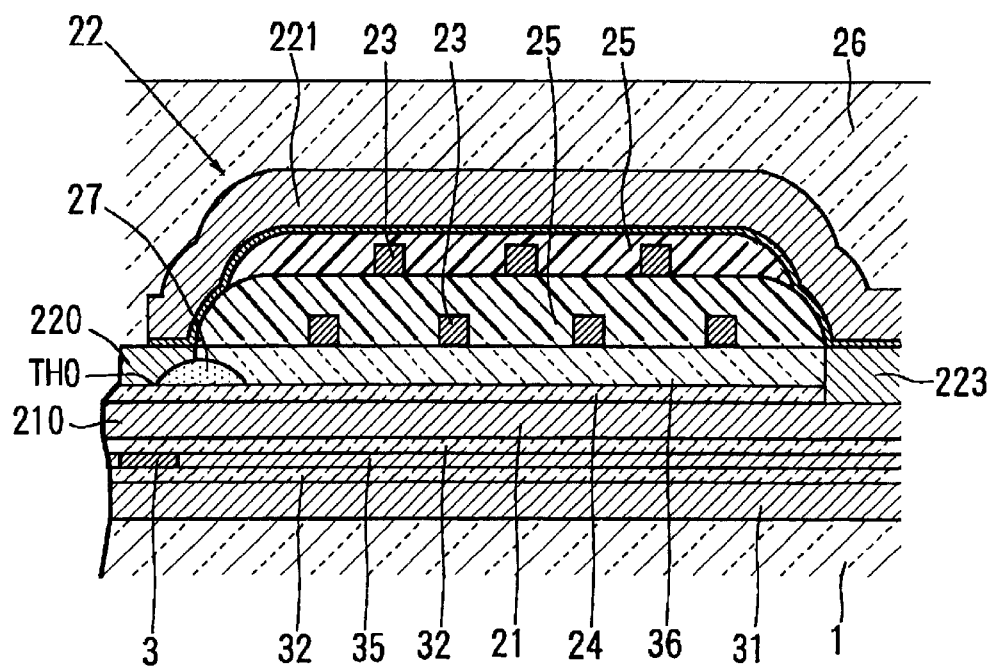
FIG. 27 is a cross sectional view showing the step after the step in FIGS. 24–26.

Thereafter, as shown in FIG. 27, the protection film 26 is formed, of $Al_2O_3$ or $SiO_2$, by sputtering, etc.

<The second type of manufacturing method>

The second type of manufacturing method includes similar steps to the ones in FIGS. 4–7. That is, as shown in FIGS. 4 and 5, the first magnetic film 21, the gap film 24, the insulating film 25 to support the coil film 23 and the second pole portion 220 are formed on the substrate 1 to constitute the slider, and thereafter, as shown in FIGS. 6 and 7, the plate underfilm M1 is formed, of permalloy or the like, over the whole surface of the assembly including the insulating film 25 and the second pole portion 220 by sputtering or the like.

Figure 28:
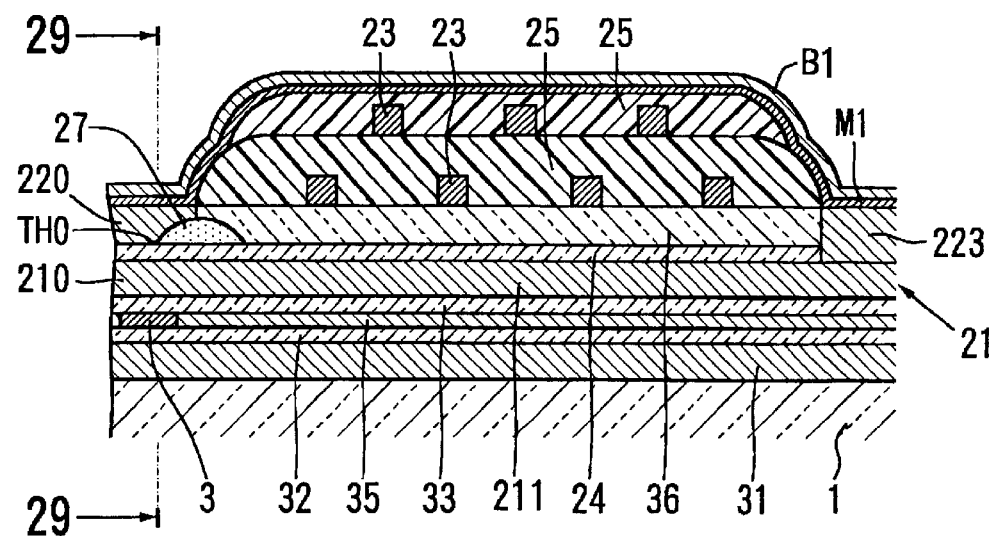
FIG. 28 is a cross sectional view showing one step included in the second type of manufacturing method of the present invention.
Figure 29:
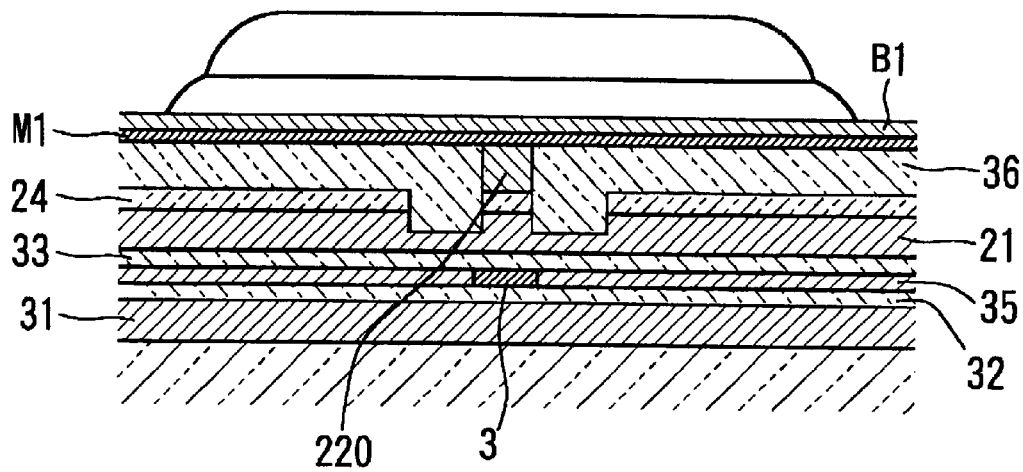
FIG. 29 is a cross sectional view taken on line "29—29" of FIG. 28.

The second type of manufacturing method is different from the first type of manufacturing method in the following steps. That is, as shown in FIG. 28 and 29, a base organic resin film B1 is applied on the plate underfilm M1. The base organic resin film B1 may be made of an organic resin not to dissolve into a solvent for the negative type resistfilm to be applied later. For example, at least one of a derivative of polysulfone polymer

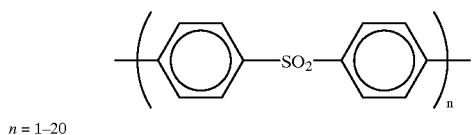

$n = 1-20$ and a derivative of maleimidevinyl copolymer

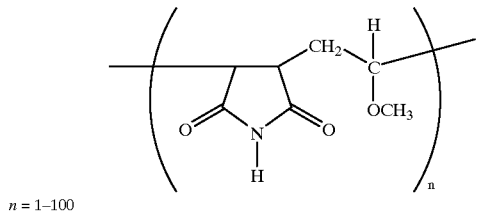

$n = 1-100$ is favorable. Such an organic resin can be applied by a spin coating method, etc.

Figure 30:
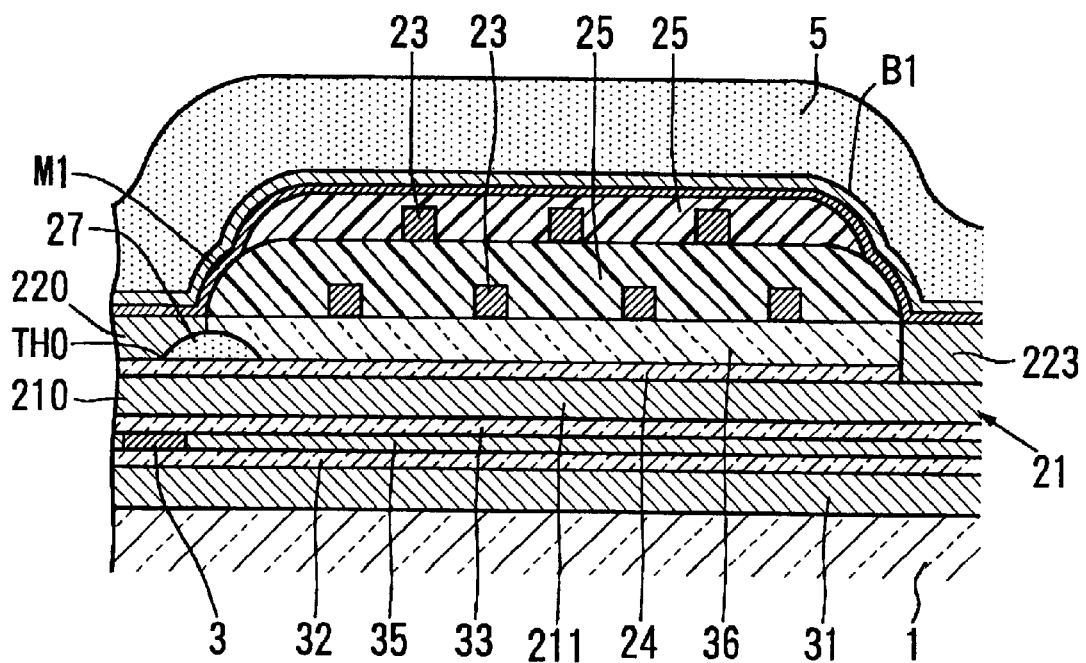
FIG. 30 is a cross sectional view showing the step after the step in FIGS. 28 and 29.

Then, as shown in FIG. 30, the negative type resist film 5 is applied on the base organic resin film B1 by a spin coating method. The negative type resistfilm may be made of a well known resist material, preferably chemical amplification type resist material.

Figure 31:
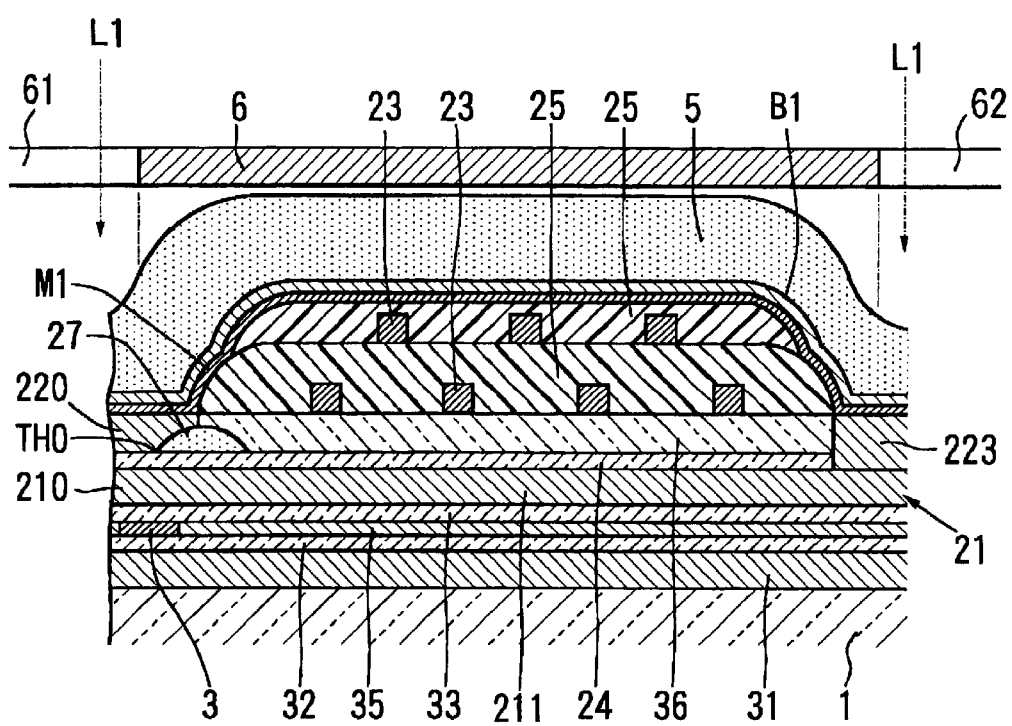
FIG. 31 is a cross sectional view showing the step after the step in FIG. 30.
Figure 32:
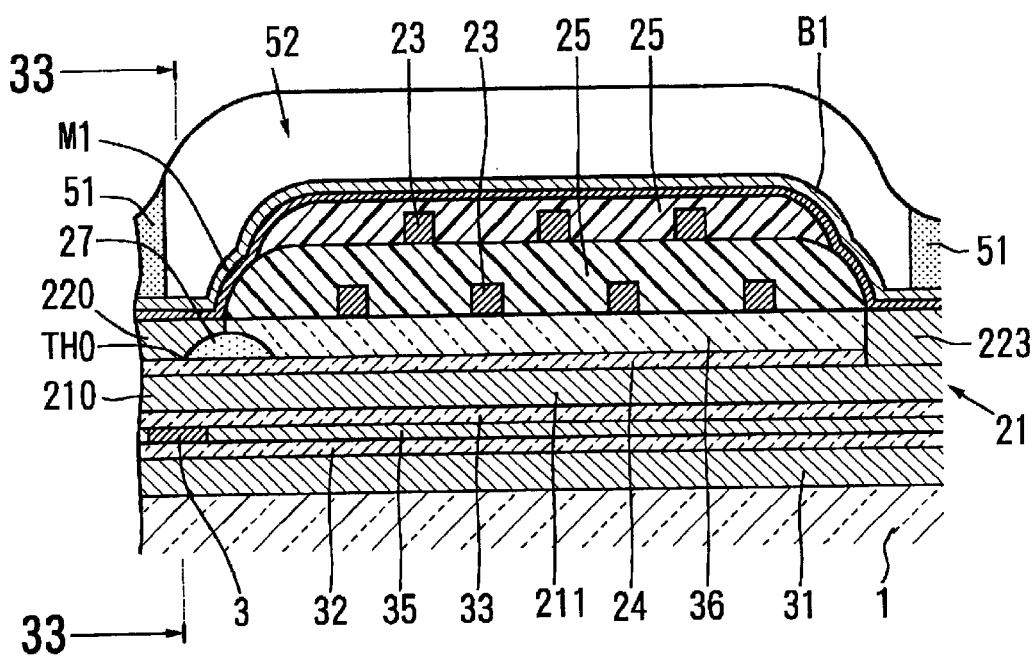
FIG. 32 is a cross sectional view showing the step after the step in FIG. 31.
Figure 33:
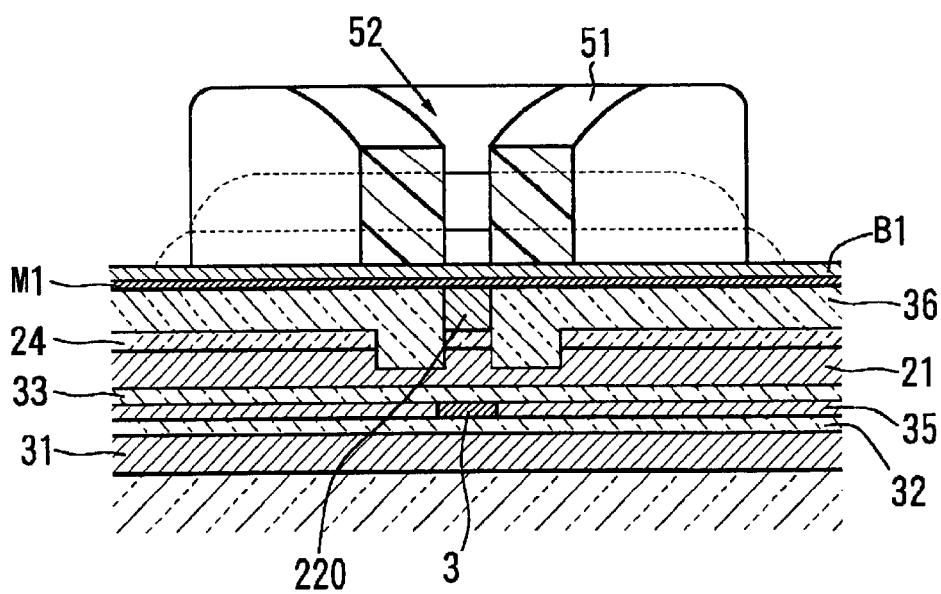
FIG. 33 is a cross sectional view taken on line "33—33" of FIG. 32.
Figure 34:
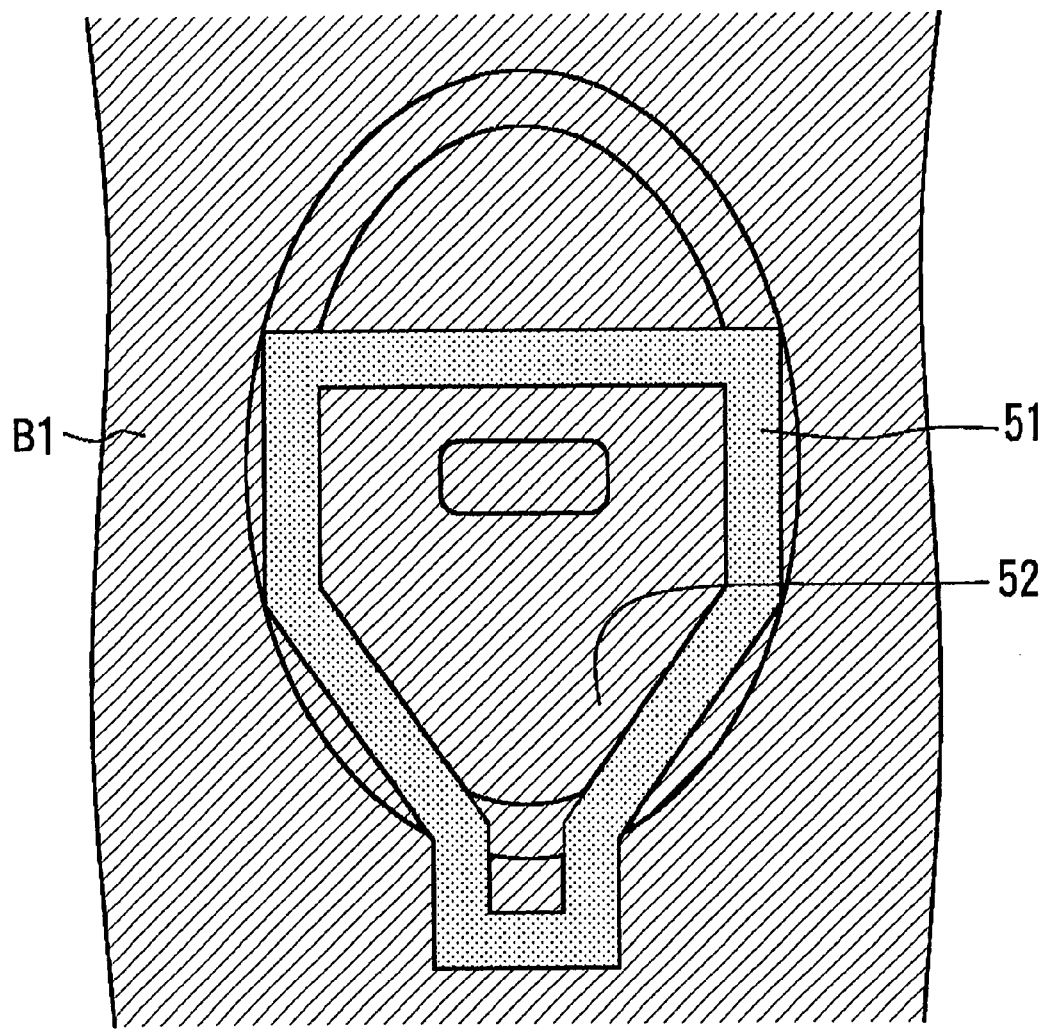
FIG. 34 is a plan view showing the step in FIG. 33.

Subsequently, for forming the second yoke portion 221 (see, FIGS. 2 and 3) composed of the second magnetic film 22, a photolithography process is performed for the negative type resistfilm 5. First of all, as shown in FIG. 31, the negative type resistfilm 5 is exposed via a photomask 6, and thereafter, developed to fabricate a resistframe 51 shown in FIGS. 32–34.

As mentioned above, the light L1 to expose the negative type resistfilm 5 is irradiated via the openings 61, 62 (see, FIG. 31) which are positioned outside from the area for the second yoke portion to be formed. Therefore, the exposing light L1 is not reflected at the plate underfilm M1 within the area, so that the pattern for the second yoke portion 221 can be fabricated precisely.

Moreover, the negative type resistframe 51 is joined with the plate underfilm M1 indirectly via the base organic resin film B1, and thus, can be prevented from being peeled off.

In the case of making the negative type resistfilm 5 of chemical amplification type resist material, the part of the resistfilm 5 to which the exposing light is irradiated cures because of the acid generated in the chemical amplification type resist material, and thereby, the resistframe 51 is fabricated.

The plate underfilm M1 is generally made of a magnetic material incorporating Fe component, particularly permalloy, and in this case, the Fe component may diffuse to and go out on the surface of the plate underfilm M1. Since the Fe component on surface of the plate underfilm is apt to form a hydroxide, the plate underfilm M1 may have hydroxyl group on its surface.

Without the base organic resin film B1, the hydroxyl group in the hydroxide may be bonded with the acid incorporated in the negative type resistfilm 5 made of the chemical amplification type resist material. Therefore, the amount of the acid to cure the negative type resistfilm 5 may be decreased in the resistfilm 5, and thus, the negative type resistframe 51 made of the chemical amplification type resist material may not be strongly joined with the plate underfilm 5.

In this second type of manufacturing method, since the base organic resin film B1 is formed on the plate underfilm M1, the acid in the negative type resistfilm 5 made of the chemical amplification type resist material is not bonded with the hydroxyl group on the surface of the plate underfilm M1. As a result, the negative type resistframe 51 made of the chemical amplification type resist material is strongly joined with the plate underfilm M1, and thus, is not peeled off easily.

The chemical amplification type resist material is composed of an alkaline soluble resin, a photosensitive acid-generating agent and a cross-linker to cross-link the alkaline soluble resin.

Figure 35:
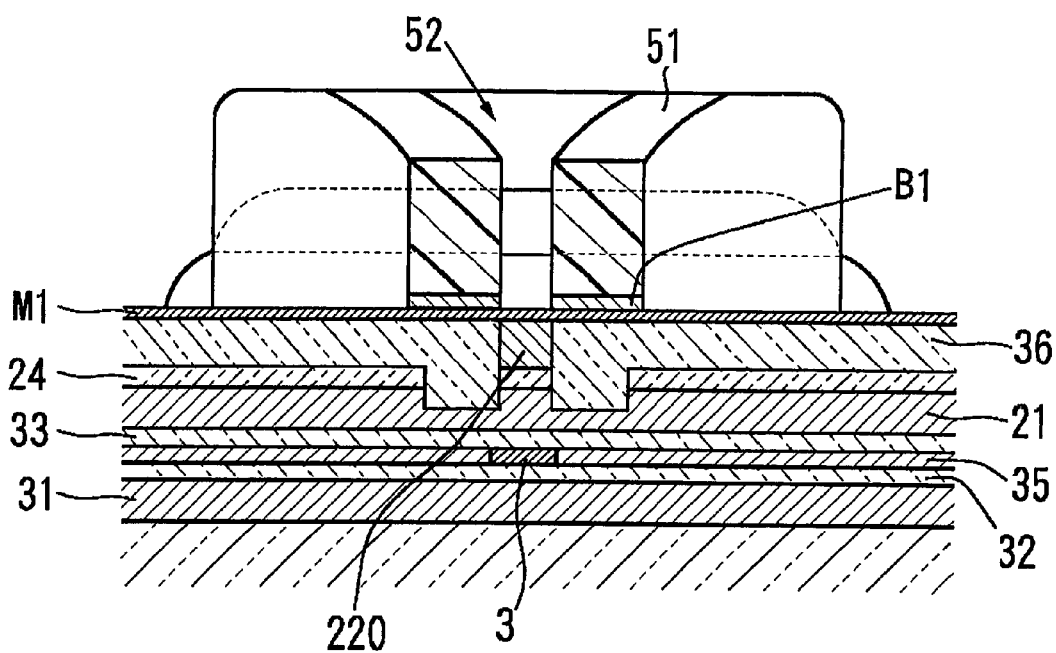
FIG. 35 is a cross sectional view showing the step after the step in FIGS. 33 and 34.
Figure 36:
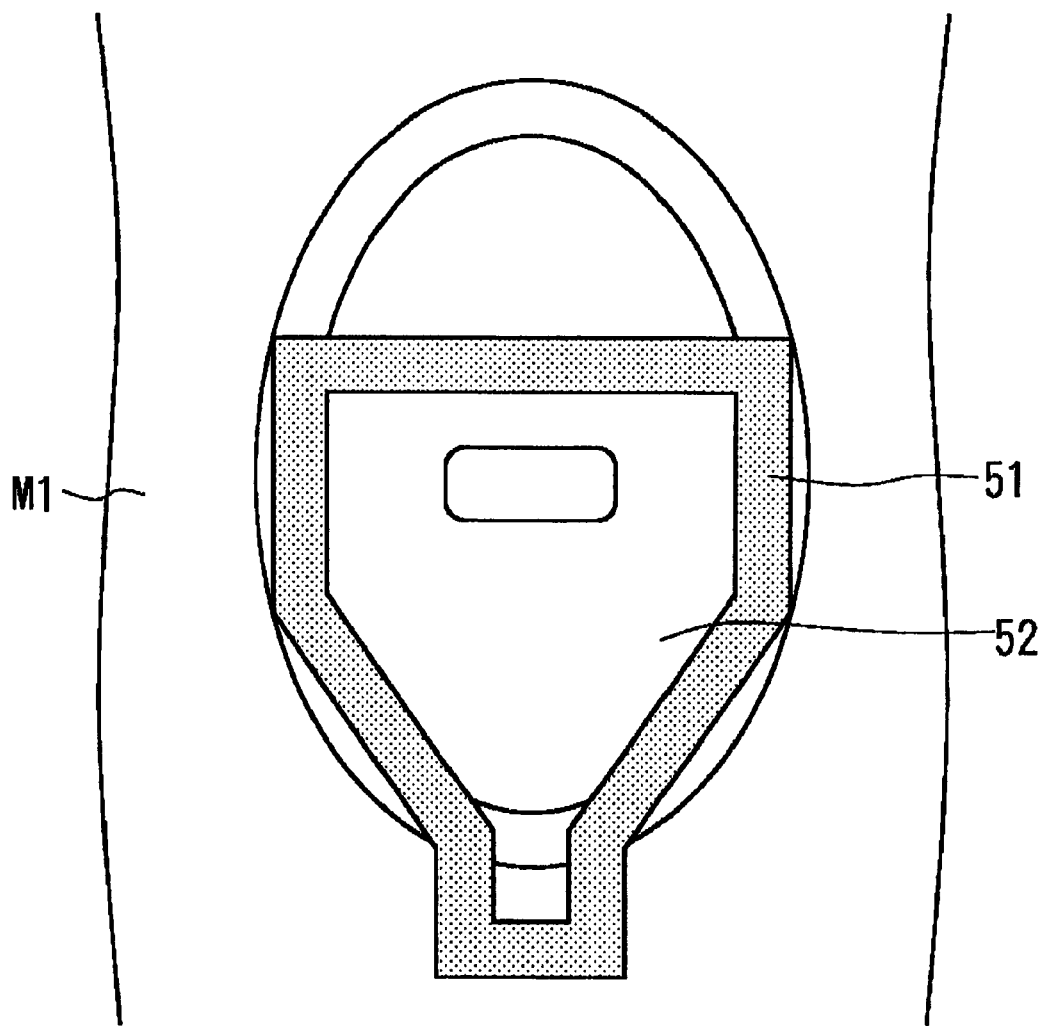
FIG. 36 is a plan view showing the step in FIG. 35.

Then, as shown in FIGS. 35 and 36, the parts of the base organic resin film B1 within and without the resistframe 51 are removed by a dry-etching method such as ashing. Thereafter, the same steps as the ones in FIGS. 13–27 of the first type of manufacturing method are carried out.

This invention is not limited to the above embodiments and every kind of variation and modification may be made without departing from the scope of the present invention.

As mentioned above, the manufacturing method, in which a thin film magnetic head is formed so as to have a second yoke portion with an end almost parallel to an ABS (with vertical end)in the side of the ABS, in forming its second pole portion and the second yoke portion independently, can be provided.

What is claimed is:

1. A method for manufacturing a thin film magnetic head comprising a slider having an air bearing surface on its medium opposing surface and a thin film magnetic head element having a first magnetic film, a coil film, an insulating film, a gap film and a second magnetic film, the first magnetic film including a first pole portion composed of its edge portion in the side of the air bearing surface and a first yoke portion continuing to the first pole portion and extending backward from the first pole portion, the gap film being provided at least on the first pole portion, the insulating film being provided above the first yoke portion and supporting the coil film, the second magnetic film including a second pole portion opposing to the first pole portion via the gap film and a second yoke portion of which one end continues to and rises up on the second pole portion and of which the other end is joined with the first yoke portion at its rear portion, comprising of the steps of:

forming, after forming the first magnetic film, the gap film, the coil film, the insulating film and the second pole portion, a plate underfilm on their exposed surfaces, forming a base organic resin film on the plate underfilm.

applying a negative photoresist film on the base organic resin film, forming a resistframe to define a pattern for forming the second yoke portion through exposing and developing for the negative photoresist film, removing the part of the base organic resin film uncovered with the resistframe, and forming a plate film to constitute the yoke portion.

2. A method for manufacturing a thin film magnetic head as defined in claim 1, wherein the insulating film includes a first insulating film to support the coil film and a second insulating film to determine a Throat Height zero point provided at the base portion of the first insulating film.

3. A method for manufacturing a thin film magnetic head as defined in claim 1, wherein the base organic resin film is made of at least one of a derivative of polysulfone polymer

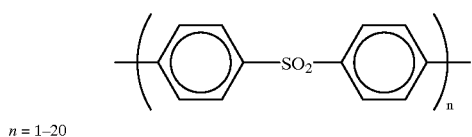

$n = 1-20$ and a derivative of maleimidevinyl copolymer.

4. A method for manufacturing a thin film magnetic head as defined in claim 1 wherein the plate underfilm is made of a magnetic material incorporating Fe component.

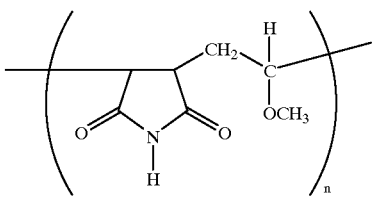

$n = 1-100$

5. A method for manufacturing a thin film magnetic head as defined in claim 4, wherein the plate underfilm is made of permalloy.

6. A method for manufacturing a thin film magnetic head as defined in claim 1 wherein the negative photoresist film is made of a chemical amplification resist material.

7. A method for manufacturing a thin film magnetic head as defined in claim 6, wherein the chemical amplification resist material is composed of an alkaline soluble resin, a photosensitive acid-generating agent and a cross-linker to cross-link the alkaline soluble resin.

8. A method for manufacturing a thin film magnetic head as defined in claim 1, further comprising the step of forming a magnetoresistive effective element.

* * * * *